(12) United States Patent
Kumar et al.

(10) Patent No.: US 7,646,779 B2
(45) Date of Patent: Jan. 12, 2010

(54) HIERARCHICAL PACKET SCHEDULER USING HOLE-FILLING AND MULTIPLE PACKET BUFFERING

(75) Inventors: Alok Kumar, Santa Clara, CA (US); Michael Kounavis, Hillsboro, OR (US); Raj Yavatkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 751 days.

(21) Appl. No.: 11/020,942

(22) Filed: Dec. 23, 2004

(65) Prior Publication Data

US 2006/0140201 A1 Jun. 29, 2006

(51) Int. Cl.
*H04L 12/56* (2006.01)

(52) U.S. Cl. .................. 370/408; 370/412

(58) Field of Classification Search .......... 370/395.4, 370/412, 408, 389, 232, 390, 395, 465, 392, 370/395.1, 395.42, 413, 468; 709/252
See application file for complete search history.

(56) References Cited

U.S. PATENT DOCUMENTS

| | | | | |
|---|---|---|---|---|
| 6,105,053 | A * | 8/2000 | Kimmel et al. | 718/105 |
| 6,272,109 | B1 * | 8/2001 | Pei et al. | 370/230 |
| 6,438,134 | B1 * | 8/2002 | Chow et al. | 370/412 |
| 6,560,230 | B1 * | 5/2003 | Li et al. | 370/395.42 |
| 6,725,456 | B1 * | 4/2004 | Bruno et al. | 718/102 |
| 7,006,513 | B1 * | 2/2006 | Ali et al. | 370/414 |
| 7,039,772 | B1 * | 5/2006 | Zandonadi et al. | 711/158 |
| 7,209,440 | B1 * | 4/2007 | Walsh et al. | 370/230 |
| 7,248,594 | B2 * | 7/2007 | Chandra et al. | 370/412 |
| 7,277,448 | B1 * | 10/2007 | Long et al. | 370/412 |
| 7,321,940 | B1 * | 1/2008 | Smith et al. | 709/240 |
| 7,372,857 | B1 * | 5/2008 | Kappler et al. | 370/395.4 |
| 7,408,932 | B2 * | 8/2008 | Kounavis et al. | 370/392 |
| 7,417,999 | B1 * | 8/2008 | Charny et al. | 370/408 |
| 7,433,364 | B2 * | 10/2008 | Chandra et al. | 370/429 |
| 7,460,544 | B2 * | 12/2008 | Jain et al. | 370/395.4 |
| 7,525,958 | B2 * | 4/2009 | Kumar et al. | 370/386 |
| 2002/0184381 | A1 * | 12/2002 | Ryan et al. | 709/234 |

(Continued)

FOREIGN PATENT DOCUMENTS

WO WO2005041503 * 5/2005

OTHER PUBLICATIONS

An adaptive OpenMP loop scheduler for hyperthreaded SMPs; Y Zhang, M Burcea, V Cheng, R Ho, V Cheng—Proc. Of PDCS-2004: International Conference on 2004.*

(Continued)

*Primary Examiner*—Ayaz R Sheikh
*Assistant Examiner*—Salman Ahmed
(74) *Attorney, Agent, or Firm*—Blakely, Sokoloff, Taylor & Zafman LLP

(57) ABSTRACT

A hierarchical packet scheduler using hole-filling and multiple packet buffering. Packet references are enqueued into a hierarchical packet scheduler, wherein the hierarchical packet scheduler includes one or more levels, each level including one or more schedulers being served by one or more threads, wherein the number of threads serving a particular level is not dependent on the number of schedulers on the particular level. Packet references are dequeued from the hierarchical packet scheduler at a root level scheduler of the one or more schedulers.

19 Claims, 19 Drawing Sheets

U.S. PATENT DOCUMENTS

| | | | |
|---|---|---|---|
| 2003/0112817 A1* | 6/2003 | Woo et al. | 370/413 |
| 2004/0081157 A1* | 4/2004 | Hassan-Ali et al. | 370/395.1 |
| 2005/0141523 A1* | 6/2005 | Yeh et al. | 370/400 |
| 2005/0152374 A1* | 7/2005 | Cohen et al. | 370/395.4 |
| 2005/0165820 A1* | 7/2005 | Pudipeddi et al. | 707/101 |
| 2005/0182773 A1* | 8/2005 | Feinsmith | 707/100 |
| 2005/0243853 A1* | 11/2005 | Bitar et al. | 370/432 |
| 2006/0029079 A1* | 2/2006 | Cohen et al. | 370/395.4 |
| 2006/0039079 A1* | 2/2006 | Kobayashi et al. | 360/78.05 |
| 2006/0140192 A1* | 6/2006 | Jain et al. | 370/395.4 |
| 2006/0140201 A1* | 6/2006 | Kumar et al. | 370/412 |
| 2006/0153184 A1* | 7/2006 | Kounavis et al. | 370/389 |
| 2006/0242319 A1* | 10/2006 | Sang et al. | 709/240 |
| 2007/0002750 A1* | 1/2007 | Sang et al. | 370/238 |
| 2008/0298372 A1* | 12/2008 | Basso et al. | 370/395.41 |

OTHER PUBLICATIONS

An active networking approach to service customization; Steenkiste, P. Chandra, P. Gao, J. Shah, U. Sch. of Comput. Sci., Carnegie Mellon Univ., Pittsburgh, PA; DARPA Active NEtworks Conference and Exposition, 2002. Proceedings Publication Date: 2002 On pp. 305-318 Meeting Date: May 29, 2002-May 30, 2002.*

Fair queueing with service envelopes (FQSE): a cousin-fair hierarchical scheduler for subscriber access networks; Kramer, G.; Banerjee, A.; Singhal, N.K.; Mukherjee, B.; Sudhir Dixit; Yinghua Ye; Selected Areas in Communications, IEEE Journal on vol. 22, Issue 8, Oct. 2004 pp. 1497-1513.*

Fair queuing with service envelopes (FQSE): a cousin-fair hierarchical scheduler for Ethernet PONs; Kramer, G.; Banerjee, A.; Singhal, N.K.; Mukherjee, B.; Dixit, S.; Ye, Y.; Optical Fiber Communication Conference, 2004. OFC 2004 vol. 1, Feb. 23-27, 2004.*

Simulation of hierarchical scheduler for ATM switches; Yaglioglu, M.; Distler, R.; Computers and Communication, 2003. (ISCC 2003). Proceedings. Eighth IEEE International Symposium on 2003 pp. 535-540 vol. 1.*

Bennett, Jon C. R. And Zhang, Hui, "Hierarchical Packet Fair Queueing Algorithms," IEEE/ACM Transactions on Networking, vol. 5, No. 5, pp. 675-689, Oct. 1997.

Stocia, Ion et al., "A Hierarchical Fair Service Curve Algorithm for Link-Sharing, Real-Time and Priority Services," ACM SIGCOMM Computer Communication Review, vol. 27 No. 4, pp. 249-262, Oct. 1997.

Keshav, Srinivasan, "An Engineering Approach to Computer Networking: ATM Networks, the Internet, and the Telephone Network," Addison-Wesley professional computing series, pp. 209-263, 1997, Addison Wesley Longman, Inc.

* cited by examiner

Table 1 - Distribution of Threads Among Microengines

| Microengine | Threads supported | Total Number of Threads |
|---|---|---|
| ME 0 | 1 Dequeue for root level<br>1 Hole-filling for root level<br>2 Hole-filling for level 1<br>2 Enqueuing for root and level 1 | 6 threads |
| ME 1 | 2 Hole-filling for level 2<br>2 Hole-filling for level 3<br>2 Enqueuing for levels 2 and 3 | 6 threads |
| ME 2 | 2 Hole-filling for level 4 (QMI threads)<br>2 Enqueuing for level 4 | 4 threads |

FIG. 8C

Table 2 - Locations of Queue Manager

| | QM collocated with leaf level threads | QM located in separate ME |
|---|---|---|
| Cost of obtaining Queue Transition information | 1 Scratchpad Ring Get access (approx. 300 compute cycles) | 1 Next Neighbor Ring Get access (approx. 1 compute cycle) |
| Cost of issuing dequeue requests | 1 Local Memory Write access plus 1 Local Memory Read access (approx. 4 compute cycles total) | 1 Scratchpad Ring Get access plus 1 Scratchpad Ring Put access (approx. 6 compute cycles total) |

FIG. 11

Table 3 - Memory Usage for Various Hierarchical Packet Schedulers

| Number of Input Queues to Scheduler | Number of Levels | Number of Comparator Nodes | Local Memory size of Hierarchical Scheduler (in bytes) | SRAM size of Hierarchical Scheduler (in bytes) |
|---|---|---|---|---|
| 8 | 1 | 1 | 100 | 0 |
| 64 | 2 | 9 | 696 | 0 |
| 512 | 3 | 73 | 720 | 4,864 |
| 4096 | 4 | 585 | 720 | 43,776 |
| 32768 | 5 | 4681 | 744 | 355,072 |
| 262144 | 6 | 37449 | 744 | 2,845,440 |

FIG. 14

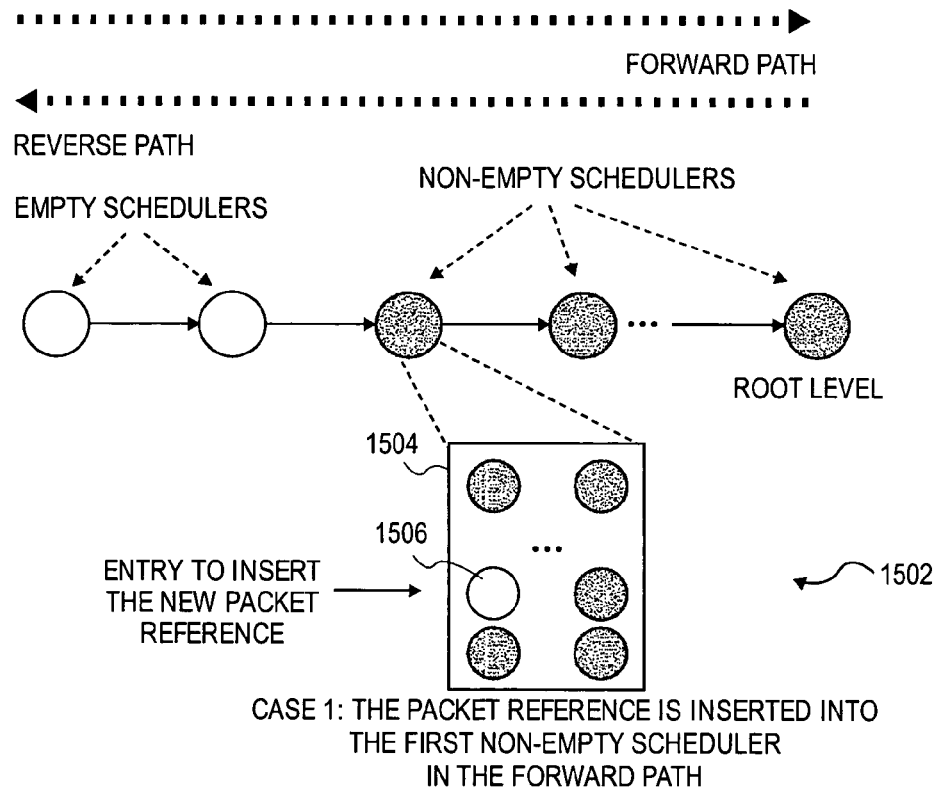
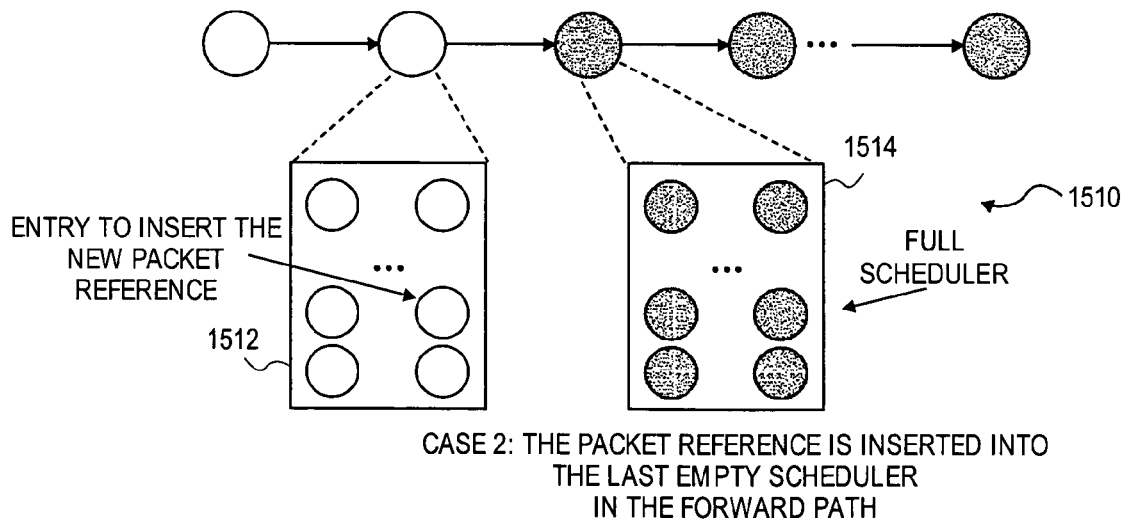
FIG. 15

HIERARCHICAL PACKET SCHEDULER USING HOLE-FILLING AND MULTIPLE PACKET BUFFERING

BACKGROUND

1. Field

Embodiments of the invention relate to the field of networking and more specifically, but not exclusively, to a hierarchical packet scheduler that uses hole-filling and multiple packet buffering.

2. Background Information

Networks provide the infrastructure for many forms of communication. LANs (Local Area Network), WANs (Wide Area Network), MANs (Metropolitan Area Network), and the Internet are common networks. Packets sent on networks are often handled by various network devices such as bridges, hubs, switches, and routers.

Typically, a packet flow in a network is routed between routers until the packets reach their destination. At any time, there may be many packet flows traversing the network between sources and destinations. When packets enter a network device, logic within the network device schedules the packets for forwarding onto their destinations.

As bit rates across networks increase, the speed of packet flow through network devices becomes a key to transmission speed between source and destination. When a network device processes multiple packet flows at the same time, packets are scheduled to maximize the rate of flow through the network device. Many current scheduling designs fail to maintain packet scheduling at the line rates of network devices.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 8C is a table illustrating one embodiment of a thread allocation scheme to support a hierarchical packet scheduler in accordance with the teachings of the present invention.

FIG. 11 is a table comparing embodiments of integrating a queue manager with a hierarchical packet scheduler in accordance with the teachings of the present invention.

FIG. 14 is a table illustrating embodiments of hierarchical packet schedulers in accordance with the teachings of the present invention.

FIG. 15 is a block diagram illustrating one embodiment of an enqueuing mechanism to support a hierarchical packet scheduler in accordance with the teachings of the present invention.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
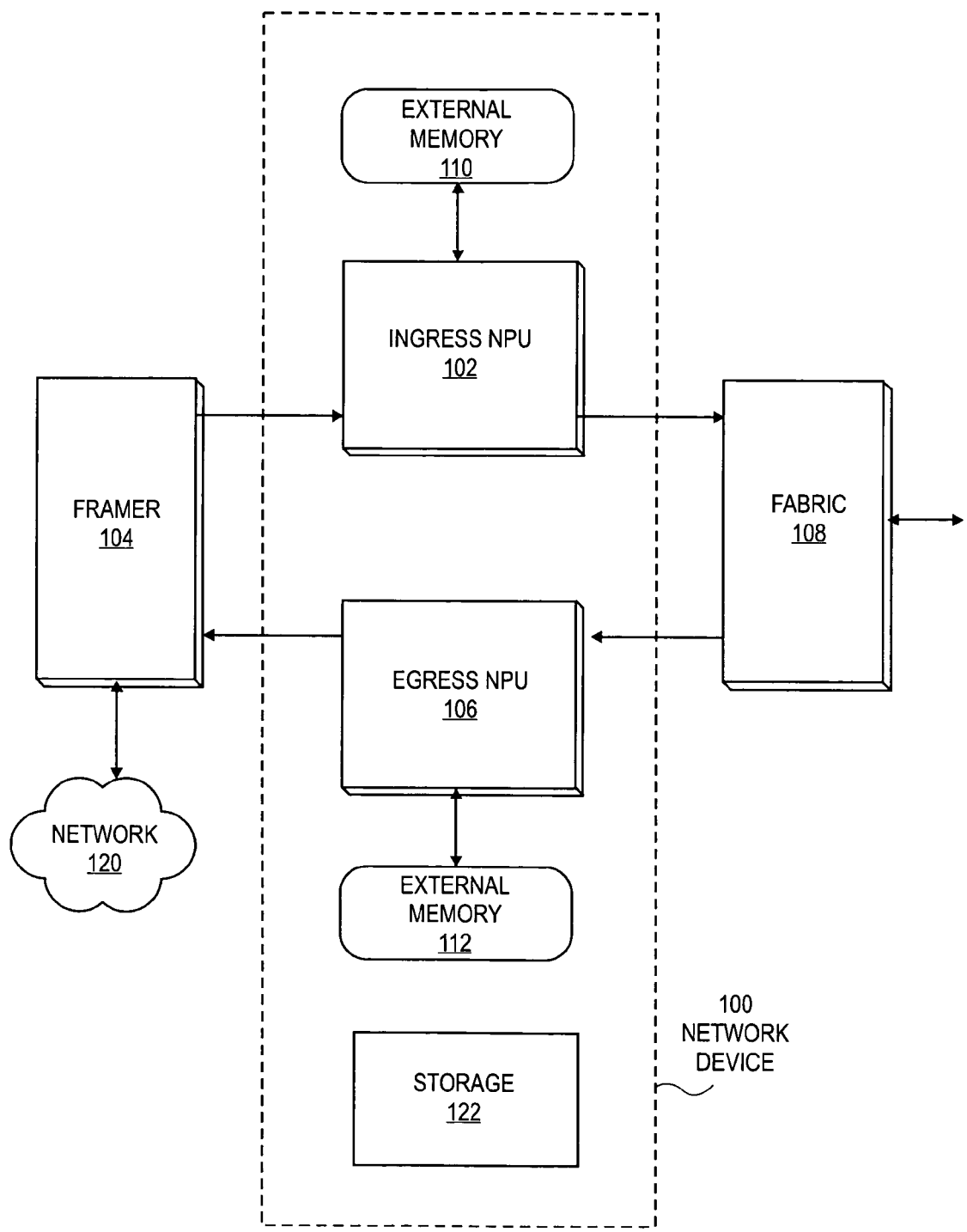
FIG. 1 is a block diagram illustrating one embodiment of an environment to support a hierarchical packet scheduler in accordance with the teachings of the present invention.

Referring to FIG. 1, an embodiment of a system to implement hierarchical packet scheduling is shown. A network device 100 includes a router, a switch, or other device for receiving and forwarding network traffic. In one embodiment, network device 100 includes a line card. It will be understood that implementations of embodiments of the present invention are not limited to the embodiment of FIG. 1.

Network device 100 includes an Ingress Network Processing Unit (NPU) 102 and an Egress NPU 106. Ingress NPU 102 is coupled to external memory 110 and Egress NPU 112 is coupled to external memory 112. The term "external memory" refers to memory resources outside of the NPUs.

Network device 100 may also include a storage device 122 for storing instructions, such as an application, executable by Ingress NPU 102 or Egress NPU 106. Storage device 122 includes volatile and non-volatile storage. In one embodiment, instructions to support a hierarchical packet scheduler as described herein are stored in storage device 122.

Ingress processing conducted by NPU 102 includes classification, metering, policing, congestion avoidance, statistics, and segmentation. Egress processing conducted by NPU 106 includes reassembly, congestion avoidance, statistics, and traffic shaping. External memory 110 and 112 include Static Random Access Memory (SRAM), Dynamic Random Access Memory (DRAM), or the like.

A Framer 104 interfaces with Ingress NPU 102 and Egress NPU 106. Framer 104 sends and receives network traffic from network 120. In one embodiment, Framer 104 interfaces with optical network traffic such as Synchronous Optical Network (SONET) traffic.

Ingress NPU 102 and Egress NPU 106 are also coupled to a Fabric 108. Fabric 108 may connect Ingress NPU 102 and Egress NPU 106 to each other and other network devices. In one embodiment, Fabric 108 includes a fabric interface chip.

Figure 2A:
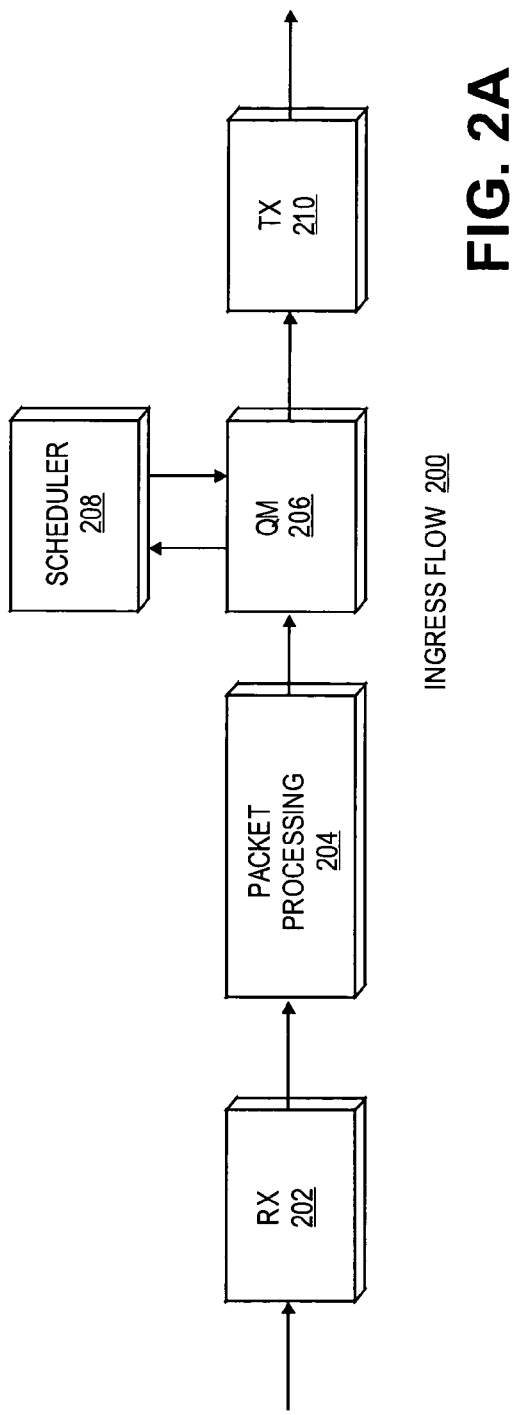
FIG. 2A is a block diagram illustrating one embodiment of an environment to support a hierarchical packet scheduler in accordance with the teachings of the present invention.
Figure 2B:
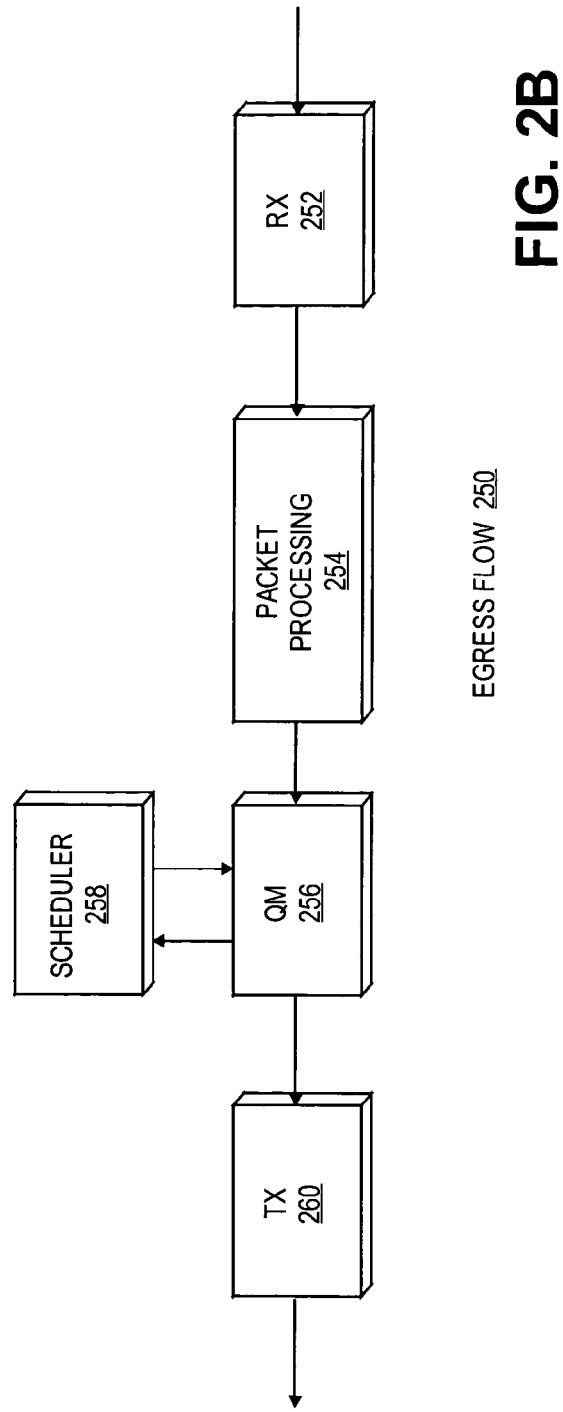
FIG. 2B is a block diagram illustrating one embodiment of an environment to support a hierarchical packet scheduler in accordance with the teachings of the present invention.

Turning to FIGS. 2A and 2B, embodiments of ingress flow 200 and egress flow 250 are shown. FIGS. 2A and 2B show high level logic components called microblocks. In one embodiment, the microblocks correspond to software applications or other instructions executable by a machine. In one embodiment, at least a portion of the microblocks of FIG. 2A are executed by Ingress NPU 102 and at least a portion of the microblocks of FIG. 2B are executed by Egress NPU 106. In one embodiment, the handling of packets by the ingress flow 200 and egress flow 250 occur in the fast path.

Ingress flow 200 begins at receive microblock 202. In one embodiment, multiple packet flows are received at Receive microblock 202 corresponding to multiple input ports of the network device. When received at the network device, the packets may initially by placed in receive buffers. The Receive microblock 202 may move the packet payload from receive buffers to DRAM, such as external memory 110. Ingress flow 200 manipulates packet references, such as header information, packet metadata and/or other packet information. The packet payload will be married back with the packet reference upon transmission. In one embodiment, Receive microblock 202 receives Ethernet packets, while in another embodiment Receive microblock 202 receives Packets Over SONET (POS).

In one embodiment, packet processing, queuing, and scheduling is done by manipulating packet references, such as packet headers, packet metadata, or the like, and not through the manipulation of an entire packet including its payload. The term "packet reference" used herein describes an entity representing a packet. This entity may include a pointer to a packet, a portion of the packet (e.g., header or payload), metadata associated with a packet, or the entire packet itself. Further, as used herein, "packet flow" refers to a plurality of packets are associated in some manner. For example, packets in the same packet flow may be from the same source and addressed to the same destination.

Ingress flow 200 then proceeds to Packet Processing 204 for packet classification and routing. After packet processing, flow 200 proceeds to Queue Manager (QM) 206 and scheduler 208. Scheduler 208 schedules packets for transmission from ingress processing 200. In one embodiment, scheduler 208 implements a hierarchical packet scheduler as described herein.

QM 206 processes enqueue and dequeue requests made from stages of ingress processing 200. As used herein, "enqueuing" involves placing a packet into a queue or similar structure. "Dequeuing" refers to removing a packet from a queue or similar structure.

Transmit microblock 210 handles the movement of data from external DRAM to the transmit buffers. Transmit microblock 210 receives transmit requests from QM 206. The transmit requests are made using the scheduler 208 and according to the bandwidth division policies specified by the scheduler 208.

FIG. 2B illustrates one embodiment of an egress flow 250. Egress flow operates similarly to ingress flow 200. Egress flow 250 may process one or more packet flows for a corresponding one or more output ports of the network device. Packet flow is received at Receive microblock 252 and then proceeds to Packet Processing 254. Egress flow then proceeds to QM 256 and Scheduler 258. Egress flow 250 then proceeds to Transmit microblock 260 for transmission.

Figure 3:
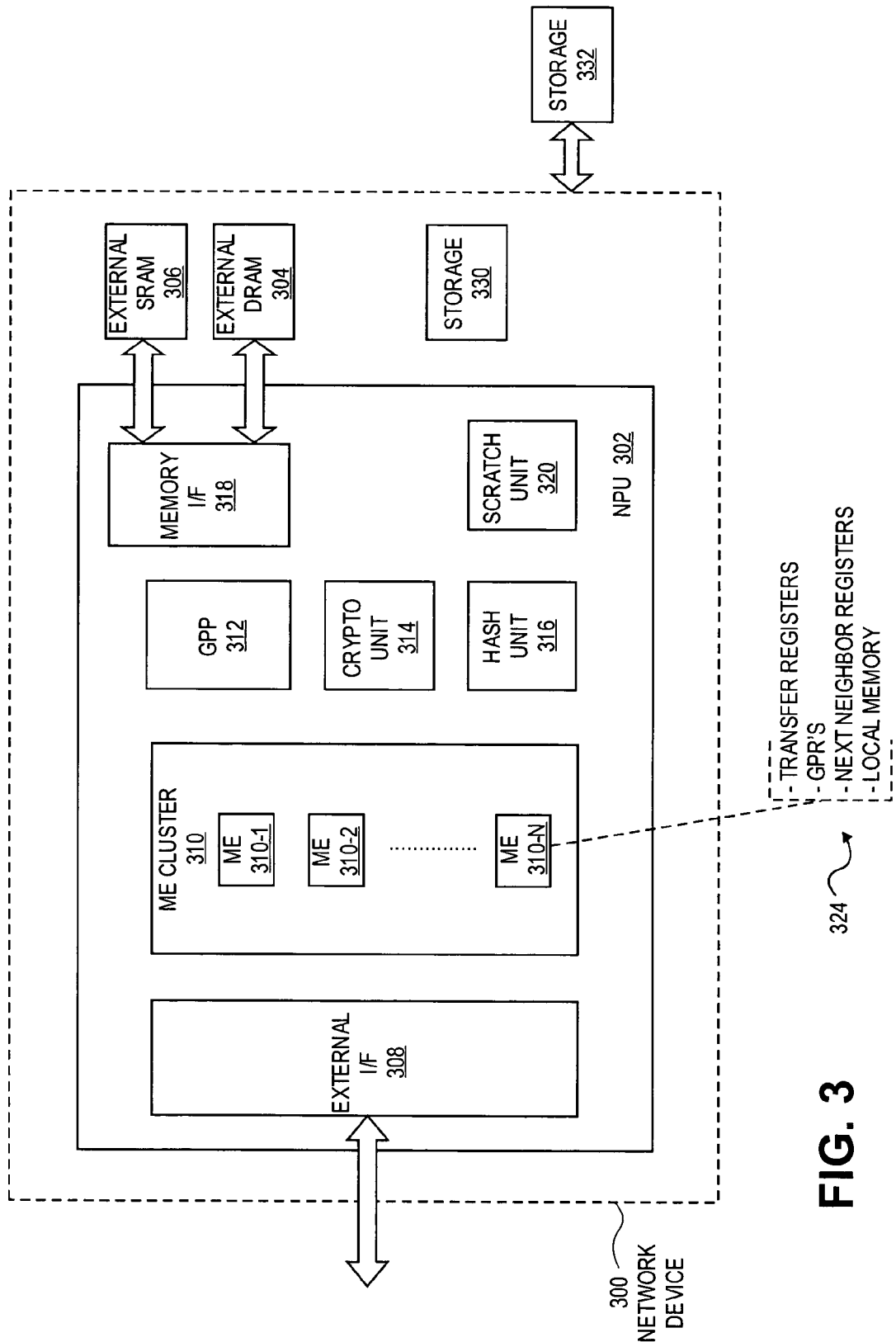
FIG. 3 is a block diagram illustrating one embodiment of an environment to support a hierarchical packet scheduler in accordance with the teachings of the present invention.

Referring to FIG. 3, an embodiment of a network device 300 is shown. It will be understood that various components of network device 300 are not shown for the sake of clarity. Further, it will be understood that components of network device 300 are connected by one or more buses or other connections, but these are not shown for clarity. Network device 300 includes an NPU 302 coupled to external DRAM 304 and external SRAM 306 by a memory interface 318. In one embodiment, NPU 302 includes, but is not limited to, an Intel® IXP (Internet eXchange Processor) family processor such as the IXP 4xx, IXP 12xx, IXP24xx, IXP28xx, or the like. It should be understood that other embodiments of network device 300 may comprise more than one NPU connected to the same or other types of memory (e.g., cache memory).

In one embodiment, network device 300 may include one or more storage devices 330 storing instructions executable by NPU 302. In another embodiment, network device 300 may receive instructions from one or more storage devices 332 that may communicate with network device 300. For the purposes of the specification, a machine-accessible storage medium includes any mechanism that provides (i.e., stores) information in a form readable or accessible by a machine (e.g., a computer, network device, personal digital assistant, manufacturing tool, any device with a set of one or more processors, etc.). For example, a machine-accessible storage medium includes, but is not limited to, recordable/non-recordable media (e.g., read only memory (ROM), static or dynamic random access memory (RAM), cache memory, magnetic disk storage media, optical storage media, a flash memory device, etc.). In addition, a machine-accessible communication medium may include any mechanism that transmits propagated signals such as electrical, optical, acoustical or other forms of propagated signals (e.g., carrier waves, infrared signals, digital signals, etc.) in a form readable or accessible by the machine.

NPU 302 may include an external interface 308 to connect network device 300 to a framer and/or a fabric. In other embodiments, the NPU may include more than one external interface. NPU 302 may also include one or more processing units. NPU 302 includes a microengine (ME) cluster 310 that includes N microengines 310-1 to 310-N. It will be understood that other types of processing units, such as a General Purpose Processor, may be employed in NPU 302 and embodiments herein are not limited to microengines.

The MEs may operate in parallel and may each provide multiple threads for packet processing. In one embodiment, the MEs are pipelined to operate on one or more packet flows concurrently. In one embodiment, ME cluster 310 includes 16 MEs of the IXP2800 network processor. In other embodiments the number and type of MEs may differ.

In one embodiment, each ME includes registers, such as registers 324 of ME 310-N. Such registers may include Transfer Registers for transferring data to and from the ME locations external to the ME, such as external SRAM 306. Such registers may also include Next Neighbor Registers to pass information between MEs. Each ME may also include General Programming Registers (GPRs). In yet another embodiment, each ME may include Local Memory. Local Memory addressing may be computed at programming run-time, while register addressing is determined at compile time and bound to the compiled instructions executed on the ME.

NPU 302 may include a General Purpose Processor (GPP) 312. In one embodiment, GPP 312 is based on the Intel XScale® technology. In another embodiment, NPU 302 may include more than one GPP. A GPP may include the same processing architecture as an ME or may have a different architecture from the MEs. NPU 302 may also include a Cryptography (Crypto) Unit 314 to perform authentication and encryption. A Hash Unit 316 may be capable of performing 48-bit, 64-bit, or 128-bit polynomial division. Scratch Unit 320 may include a Scratchpad memory. In one embodiment, Scratchpad memory includes 16 Kilobytes (KB) of memory with a memory frequency of 700 Megahertz (MHz).

Figure 4A:
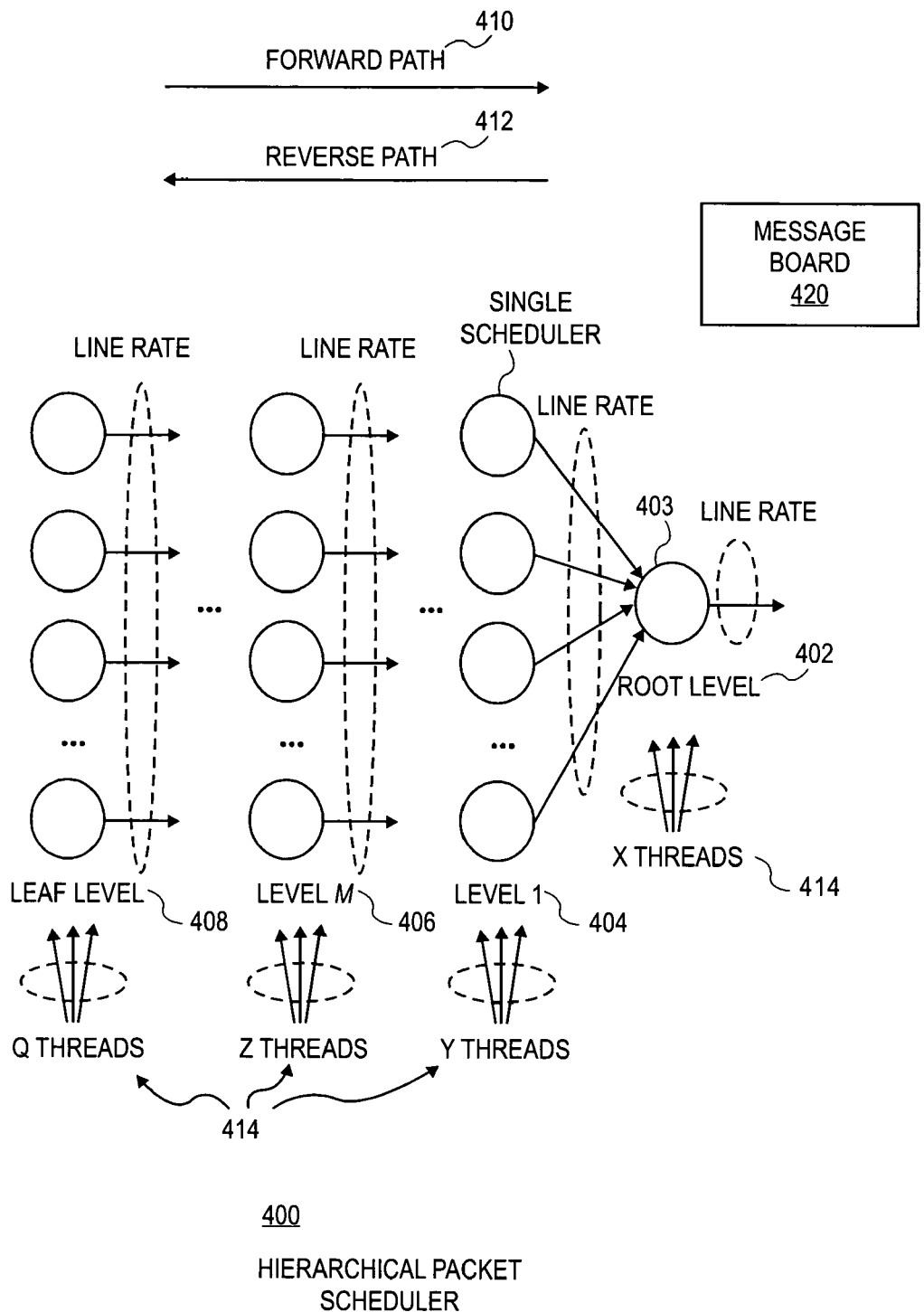
FIG. 4A is a block diagram illustrating one embodiment of an environment, where threads execute in parallel supporting a hierarchical packet scheduler in accordance with the teachings of the present invention.

Referring to FIG. 4A, an embodiment of a hierarchical packet scheduler 400 is shown. As will be discussed below, hierarchical packet scheduler 400 provides packet scheduling by performing dequeuing operations at the root level without waiting for hole-filling operations from previous levels to complete. Embodiments of "hole-filling" will be discussed below. Further, embodiments herein use multiple packet buffering at each scheduler in the hierarchy to ensure packet references may be fed toward the root level at line rate and may be outputted from the root level at line rate. Embodiments of "multiple packet buffering" will be discussed below.

Hierarchical packet scheduler 400 includes a root level 402 having a single scheduler 403. The root level has next levels 404, 406 and others down to a leaf level 408. Each level is served by one or more threads, as shown at 414. The threads include threads of microengines (MEs) and General Purpose Processors (GPPs) as discussed in conjunction with FIG. 3. In one embodiment, scheduler 400 may have 4 or 5 levels and thousands of schedulers. It will be understood that the structure of scheduler 400 is a tree structure, however, not all schedulers and their connections are shown for the sake of clarity. The term "single-level scheduler" is used herein to refer to a node of the tree structure of the hierarchical packet scheduler.

Further, the terms "parent scheduler" and "child scheduler" are used herein to refer to a relationship between single-level schedulers that are on two different levels of the hierarchy. The scheduler on the previous level is considered the parent. The term "previous level" refers to the level which is closer to the root scheduler compared to another level. The term "child scheduler" refers to a scheduler on the next level that feeds packets into a parent scheduler along a "forward path" of packets. The term "next level" refers to a level which is further from the root scheduler compared to another level.

It will be understood that the root level scheduler may be a parent scheduler, but may not be a child scheduler. Also, a forward path 410 describes a flow from the leaf to the root level, while a reverse path 412 describes a flow from the root to the leaf level.

Root level scheduler 403 outputs packets at line rate. Line rate includes the speed of the physical connection. In one embodiment, the line rate is Optical Carrier-level 48 (OC-48) which is approximately 2.5 Gigabits per second (Gbps). In another embodiment, line rate is OC-192 which is approximately 10 Gbps.

Further, packets are exchanged between levels at line rate. In one embodiment, packet references may be exchanged between levels at an aggregate rate which is equal to the line rate. For example, assume 8 schedulers of level 1 are providing packets to the root level scheduler. The combined output rate of packet references from all 8 schedulers is at least line rate. This aggregation of line rates occurs at each level of the hierarchical packet scheduler. In this way, packet references may be continuously outputted from the hierarchical packet scheduler at line rate.

Each level of hierarchical packet scheduler 400 is served by threads. In general, a thread includes a sequence of associated instructions. A single ME or GPP may execute more than one thread at a time. It is noted that according to embodiment herein each thread serves an entire level of the hierarchy, as opposed to a particular single-level scheduler. Also, there are not necessarily the same number of threads serving each level. The number of threads allocated to each level is an implementation consideration that will be discussed further below.

Threads serving hierarchical packet scheduler 400 may communicate with each other. In one embodiment, message boards, such as message board 420, are used for communications between thread serving adjacent levels in the hierarchy. Messages written by the root scheduler 403 indicate which scheduler at the next level in the hierarchy should provide head-of-line packets when needed. Similarly, a scheduler at level 1 uses a message board, not necessarily the same as the message board 420, to request a packet from a scheduler at level 2. Processing units within an NPU, such as MEs and GPPs, as described herein may offer a variety of methods for inter-thread and inter-microengine message board communication. Such methods include, but are not limited to, inter-thread signaling, fast on-chip memory (memory which is local to an ME or GPP), cache memory, IXP next neighbor registers, or the like. Message boards may be stored in Next Neighbor Registers or in Local Memory.

In short, threads are assigned to serve each entire level of the hierarchical packet scheduler 400. Threads are not assigned to any one particular single-level scheduler in the hierarchy but to an entire level. In other words, the number of threads serving a particular level is not dependent on the number of schedulers on that particular level.

There are several types of threads serving the levels of the hierarchical packet scheduler 400. First, "dequeuing" threads forward packets from the root level to the network or some other entity such as a switch fabric. Second, "enqueuing" threads take new incoming packets and place them in schedulers in the hierarchy. These new packets are sorted inside single-level schedulers based on assigned tags. Each tag, also referred to as 'time stamp' in this document, indicates the order that packets are to be forwarded from a child single-level scheduler to a parent single-level scheduler or from the root scheduler of the hierarchical packet scheduler to the network or some other entity such as a switch fabric. In one embodiment, new packets are enqueued from one or more queues in external SRAM that are maintained by a Queue Manager.

Third, "hole-filling" threads at each level move packet references up from lower levels in parallel. The term "hole-filling" is used herein to refer to a procedure of moving packets from schedulers of a next level into a scheduler of a previous level. The term "hole" refers to an empty packet space in a scheduler. A hole is created in a scheduler when a packet is moved toward the root level in the hierarchy, such as from a level 2 to level 1. As will be discussed further below, a hole-filling thread patrols a particular level of the hierarchical scheduler responding to a message board indicating that a single-level scheduler has a hole that needs to be filled. A hole-filling thread fills the hole by inserting a packet from the next level. This creates another hole at the next level that is filled by a hole-filling thread serving this next level. In this way, packets are continuously fed up to the root level.

It is noted that the hole-filling threads work in parallel to complete hole-filling tasks. The hole-filling operations are parallel in that a hole-filling thread fills a hole in a parent scheduler, leaves a message regarding a hole created in the child scheduler, and moves on to another hole-filling task. The hole-filling thread does not wait for the hole in the child scheduler to be filled, but moves on to other hole-filling tasks on its assigned level of the hierarchy. The hole-filling thread knows a hole-filling thread on the child scheduler's level will take care of the hole in the child scheduler. Thus, hole-filling threads on different levels complete assigned tasking on their respective levels without delay. This parallelism enables the hierarchical packet scheduler to maintain a line rate output of packet references.

Figure 4B:
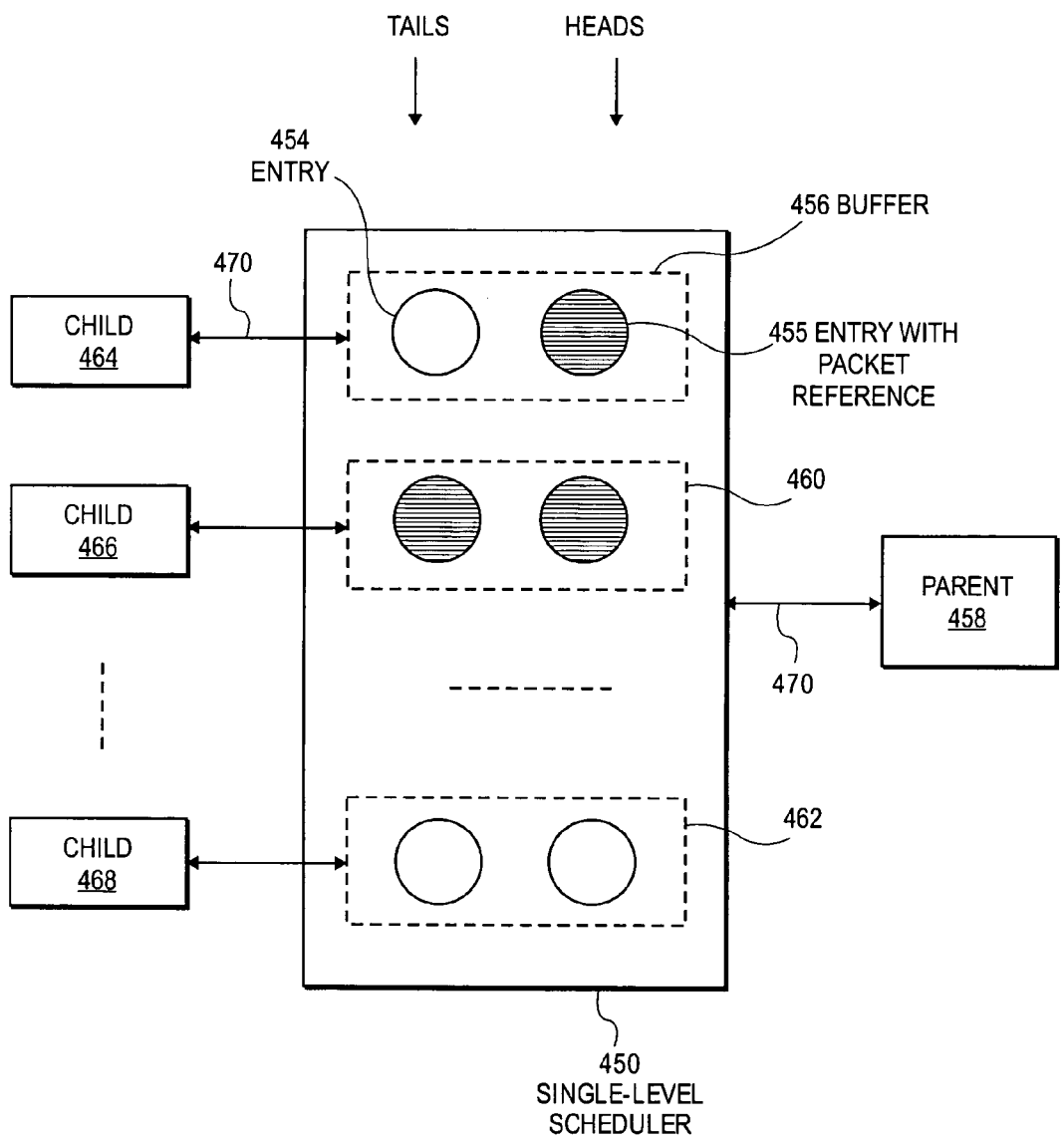
FIG. 4B is a block diagram illustrating one embodiment of a single-level scheduler that supports a hierarchical packet scheduler in accordance with the teachings of the present invention.

Turning to FIG. 4B, an embodiment of a single-level scheduler 450 is shown. In scheduler 450, a buffer 456 includes entries 454 and 455. One of the entries is a tail and the other is a head of buffer 456. Entry 454 is empty and may be considered a hole, while entry 455 contains a packet reference. Buffer 460 is full and buffer 462 is empty. In one embodiment, when the head of a buffer is moved to its parent scheduler, the packet reference in the tail of the buffer is slid to the head of the buffer.

Buffer 460 is connected to child scheduler 466 and buffer 462 is connected to child buffer 468. Scheduler 450 is also connected to its parent scheduler 458. In one embodiment, scheduler 450 has associated 8 buffers corresponding to 8 connections to 8 child schedulers. In other embodiments the number of buffers per scheduler may differ. As will be discussed below, connection 470 may be given a connection identifier (connectionID) that describes the schedulers a particular packet reference will pass through in the hierarchy from the leaf to the root level. An embodiment of a data structure for maintaining a scheduler will be discussed below in conjunction with FIG. 12.

In one embodiment, multiple packet buffering may be used at each scheduler to cope for the fact that fetching scheduler state information from external memory units may take more time than the headroom associated with a particular processor architecture. We use the term 'headroom' in this document to refer to the maximum time a processing unit is allowed to spent processing a packet without violating the line rate forwarding requirement. This fetch time may affect the ability of the hierarchical packet scheduler to continually output packet references at line rate. Having multiple packet references in each buffer provides more time for memory access. Further, multiple hole-filling requests to the same buffer may be served by multiple independent hole-filling threads serving the same level. The number of packet references stored per buffer may be two or more.

In one embodiment, the maximum number of entries in a buffer is equal to the smallest integer which is larger than the ratio between time required for completing a hole-filling operation and the NPU headroom. For example, in one embodiment, to meet the OC-48 line rate using an Intel® IXP 2800 family processor, two packet references are buffered at each entry of every single-level scheduler of the hierarchy. This is because the NPU headroom in the IXP 2800 is equal to 228 computer cycles, whereas a single memory access to external memory requires 300 computer cycles to complete. The ratio of 300 to 228 is approximately 1.3. The next larger integer from 1.3 is 2. Thus, by maintaining two packet references in each buffer, a single hole-filling thread has 456 cycles (2×228 cycles) to complete a hole-filling task.

In yet another embodiment, the maximum number of entries in each buffer is equal to the number of hole-filling threads serving the levels of the hierarchical packet scheduler. In this particular embodiment, if two hole-filling threads are serving each level, then the maximum number of entries is two. In this way, each entry in the same buffer has the opportunity to be served at the same time.

Figure 5:
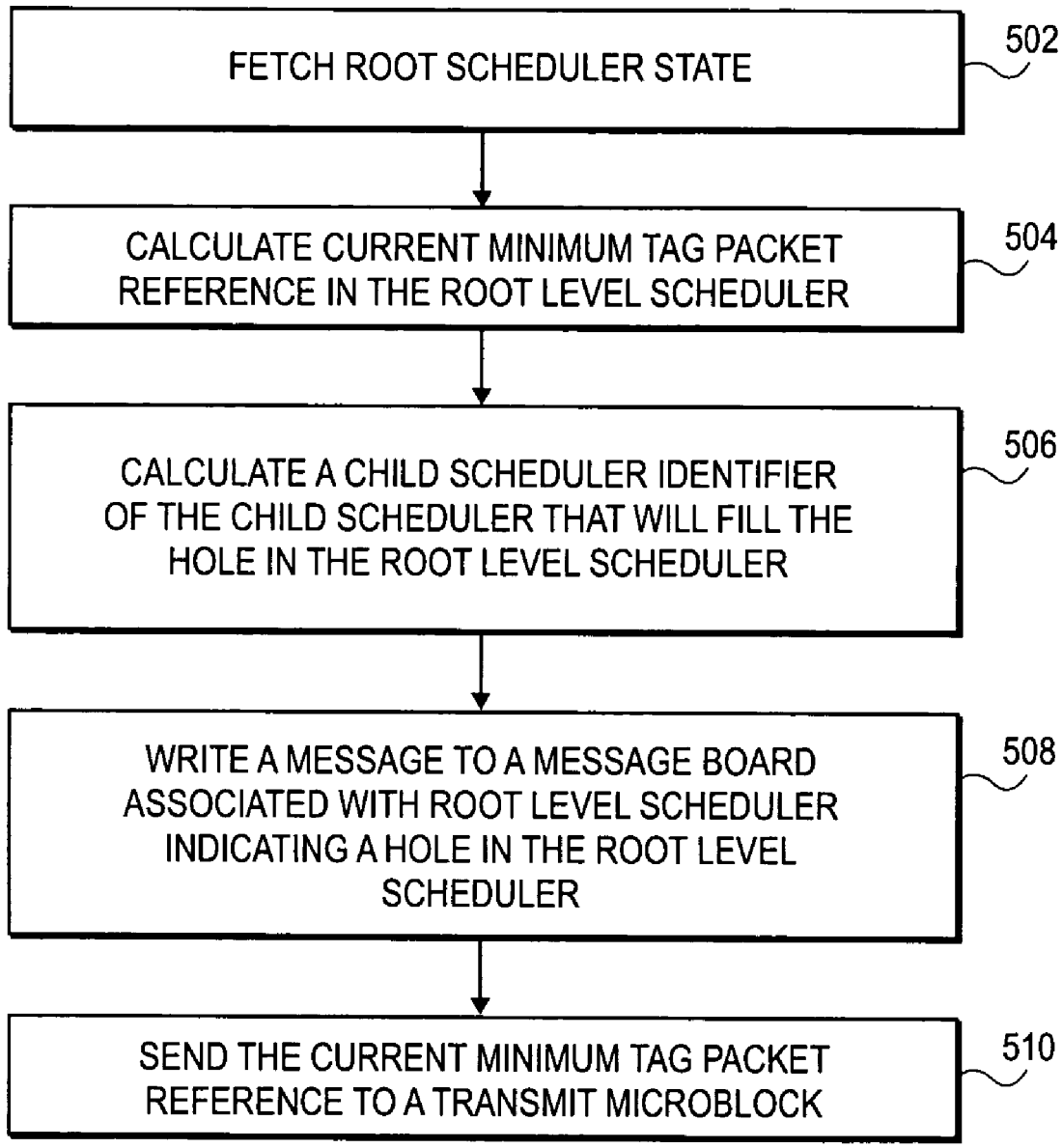
FIG. 5 is a flowchart illustrating one embodiment of the logic and operations of a dequeuing thread of a hierarchical packet scheduler in accordance with the teachings of the present invention.

Turning to FIG. 5, an embodiment of a flowchart 500 for a dequeuing thread is shown. Beginning in a block 502, the state of the root scheduler is fetched. The state information may include information concerning packet reference tags. In one embodiment the state of a single-level scheduler includes information about the absence of presence of packets in the buffers of the scheduler, references to packets, packet size values for all packets stored in the buffers of the scheduler, time stamp values for all packets, and "connection weight" values associated with each buffer of the single-level scheduler. Connection weights are numbers which specify bandwidth division policies, as discussed below. In other embodiments, a single-level scheduler state may include a subset of this information. This amount of state may be stored in fast memory or local registers.

Proceeding to a block 504, the current minimum tag packet reference in the root level scheduler is calculated. In one embodiment, comparisons on the tags of all the packet references in the heads of the scheduler buffers are made and the packet reference with earliest timestamp is identified as the current minimum tag packet.

Continuing to a block 506, the identifier of the child scheduler that contains the packet reference that will fill the hole made by sending the current minimum tag packet reference in the root level scheduler is calculated. One embodiment of calculating the child scheduler identifier is discussed below in connection with Equation 1. In another embodiment, the identifiers of all child schedulers of the root level may be stored as part of the root level scheduler state.

Continuing to a block 508, a message is written into a message board associated with the root scheduler indicating a hole in the root level scheduler. The message may include the identity of the child scheduler whose packet reference is to be used to fill the hole in the root level scheduler. As discussed below, a hole-filling thread will be responsible for reading the message board and filling the hole at the root level scheduler.

In one embodiment, a message may include the following information: the child scheduler identifier, the parent scheduler identifier (which is the root level scheduler in the case of the dequeuing thread), the entry (i.e., the hole) in the parent scheduler that is to be filled, the tag of the packet reference that was removed from the parent scheduler, and the connection weight of the packet reference that was removed from the parent scheduler. In one embodiment, Local Memory may be used to hold message boards.

Proceeding to a block 510, the current minimum tag packet reference is sent from the root level scheduler to the transmit microblock for transmission.

Figure 6:
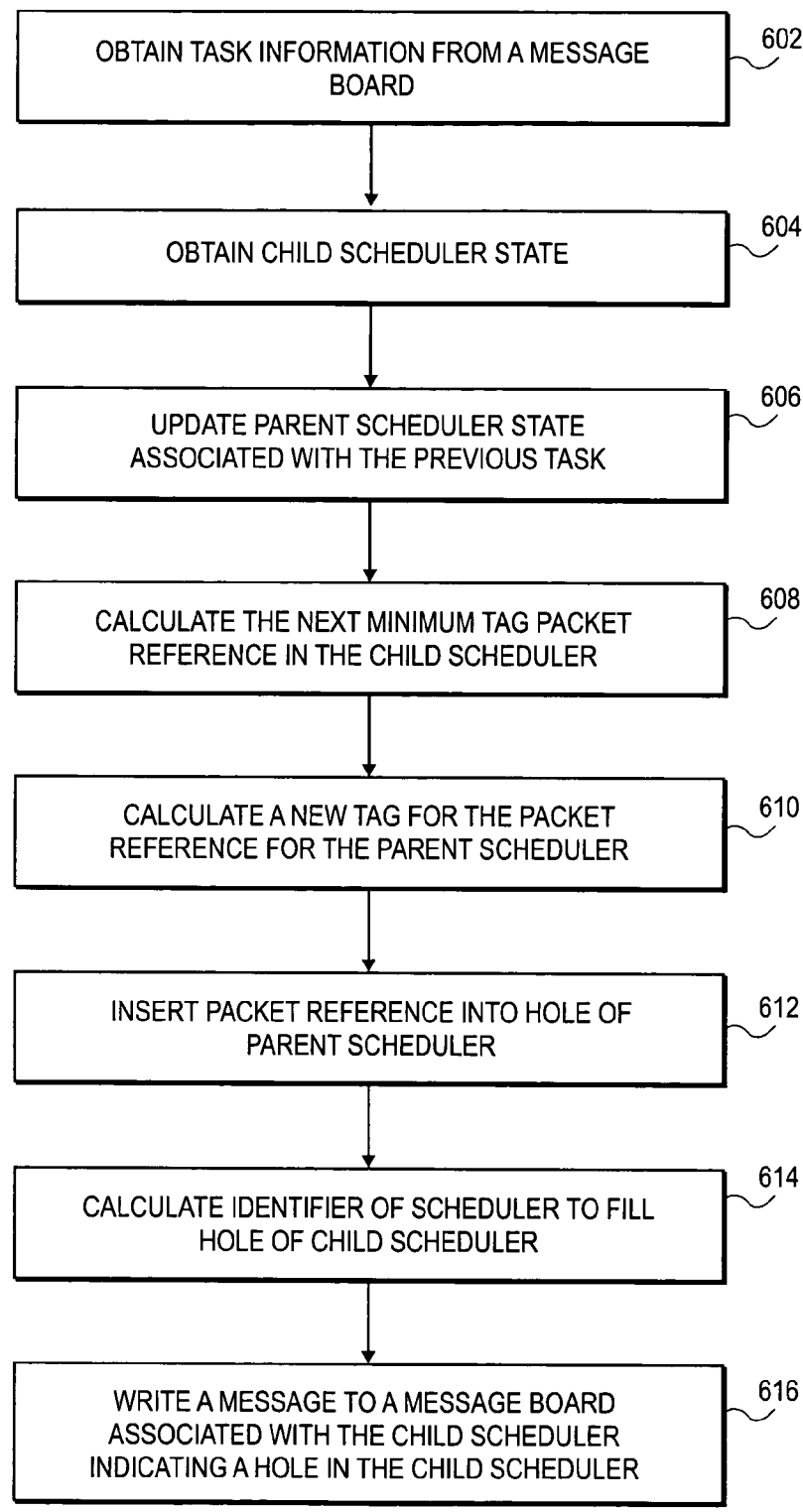
FIG. 6 is a flowchart illustrating one embodiment of the logic and operations of a hole-filling thread of a hierarchical packet scheduler in accordance with the teachings of the present invention.

Turning to FIG. 6, an embodiment of a flowchart 600 for a hole-filling thread is shown. In one embodiment, hole-filling threads serving the same level are executed in the same ME. This enables the hole-filling threads to quickly exchange information, if necessary.

Starting in a block 602, the hole-filling thread obtains hole-filling task information from a message board.

Continuing to a block 604, the state of the child scheduler identified in the message is obtained. In this way, the hole-filling thread has the most up-to-date information regarding the child scheduler.

Proceeding to a block 606, the state of the parent scheduler associated with a previous hole-filling task is updated.

Continuing to a block 608, the next minimum tag packet reference in the child scheduler is calculated.

Proceeding to a block 610, a new tag is calculated for the packet reference for insertion into the parent scheduler. Each scheduler is autonomous and maintains its own virtual time. The virtual time of one scheduler is not related to the virtual time of another scheduler. When a packet reference is moved from a child scheduler to a parent scheduler, the tag of the packet reference is adjusted for the virtual time of the parent scheduler. The packet reference maintains its tag order in relation to the other packet references in the parent scheduler, but the time stamp value of the packet is changed from referencing the virtual time of the child scheduler to referencing the virtual time of the parent scheduler.

Continuing to a block 612, the packet is inserted into the hole of the parent scheduler. Proceeding to a block 614, an identifier of a scheduler to fill the hole of the child scheduler is calculated. In one embodiment, the identifier is calculated using Equation 1 discussed below. Proceeding to a block 616, a message is written to a message board associated with the child scheduler indicating the child scheduler has a hole. As discussed above, a hole-filling thread serving the child scheduler's level will read the message and fill the hole of the child scheduler.

Figure 7:
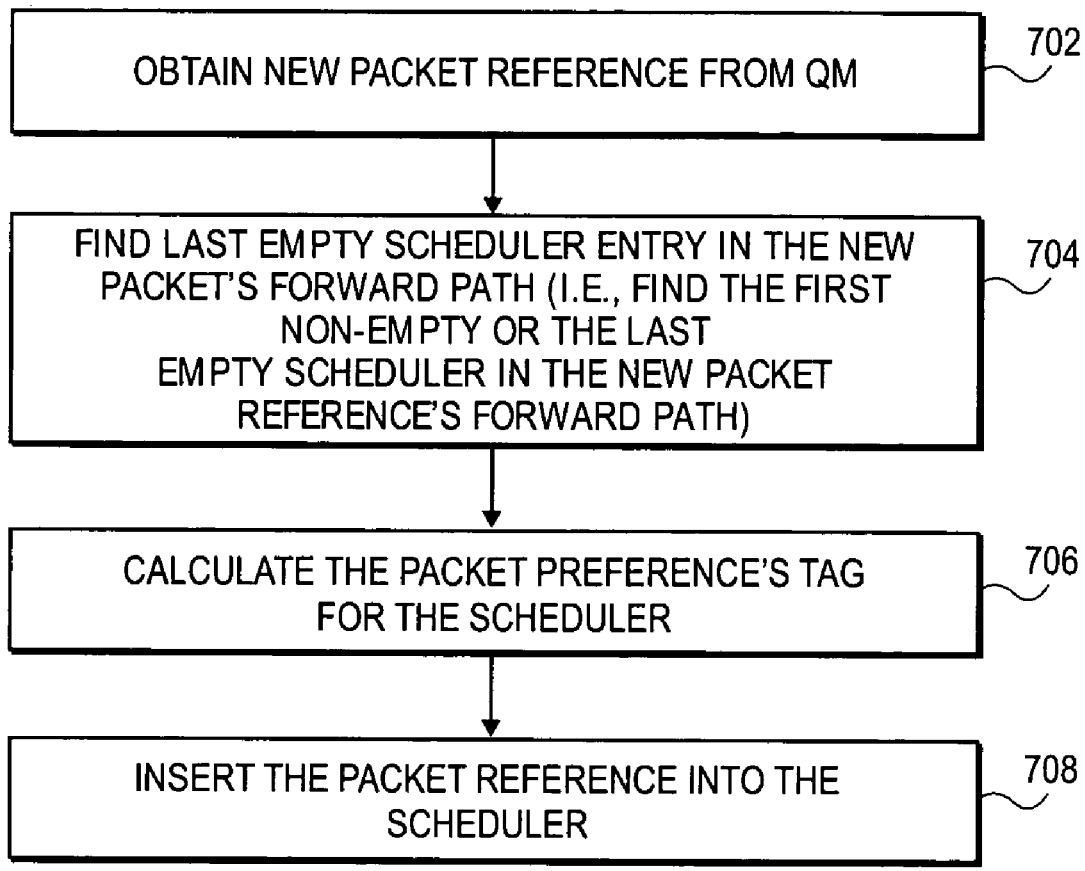
FIG. 7 is a flowchart illustrating one embodiment of the logic and operations of an enqueuing thread of a hierarchical packet scheduler in accordance with the teachings of the present invention.

Turning to FIG. 7, an embodiment of a flowchart 700 for an enqueuing thread is shown. Starting in a block 702, a new packet reference is obtained from the Queue Manager. Proceeding to a block 704, the last empty scheduler entry in the new packet reference's forward path from the leaf level to the root level is found. The term "scheduler entry" refers to a packet space to hold a packet reference as part of a buffer in a single-level scheduler. The last empty scheduler entry in a packet's forward path can be found either in the last empty or in the first non-empty scheduler in the packet's forward path, as discussed below. In one embodiment, the reverse-path of a packet is followed in order to find the appropriate scheduler (discussed further below). Thus, a packet reference does not have to be enqueued at the leaf level, but can be enqueue at an appropriate scheduler at any level in the packet references path through the hierarchical packet scheduler. In another embodiment, a packet reference follows a forward path through the hierarchical packet scheduler.

Proceeding to a block 706, the packet reference's tag for the scheduler is calculated. The virtual time from the scheduler's state is accessed and used to set the packet reference's tag. Continuing to a block 712, the packet reference is inserted into the scheduler.

IXP 2800 Implementation

Figure 8A:
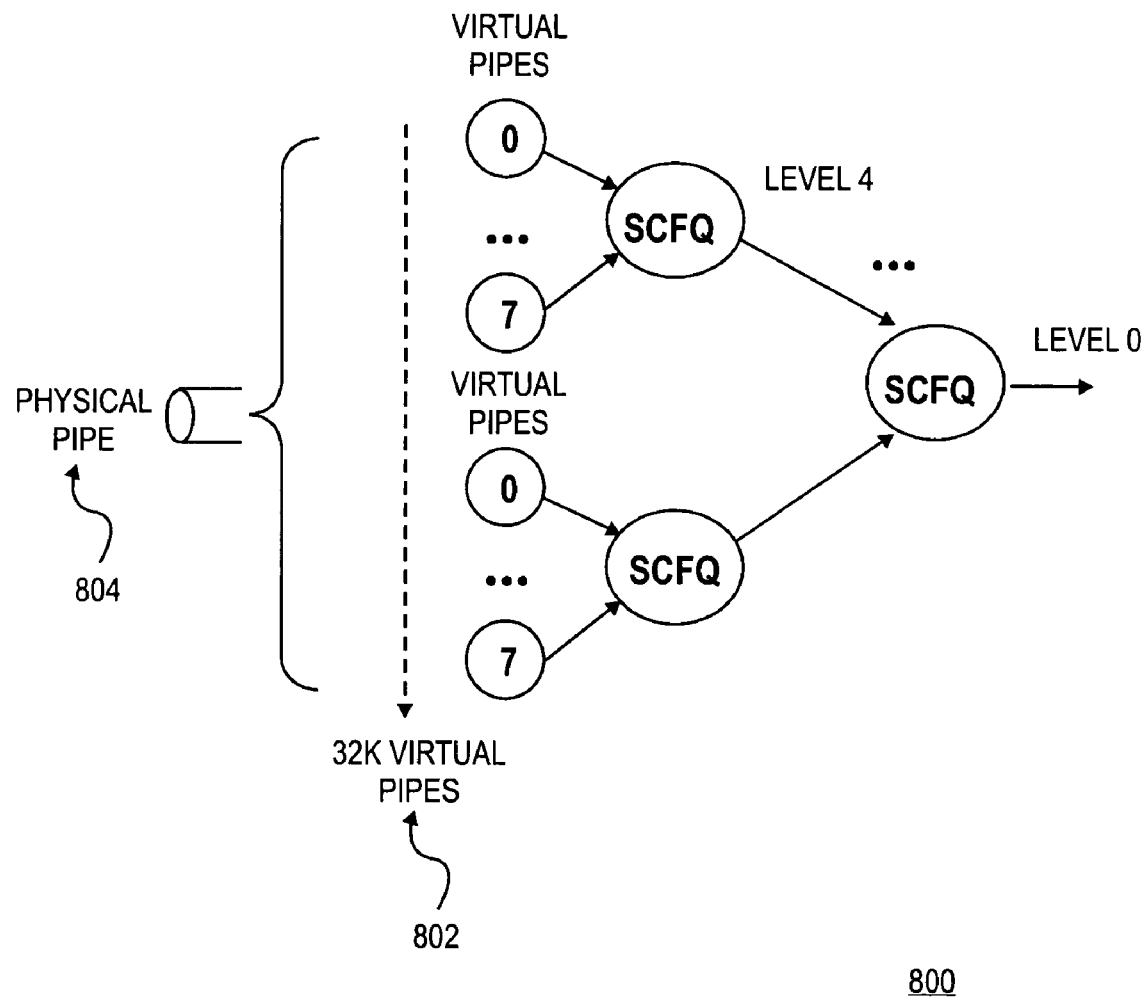
FIG. 8A is a block diagram illustrating one embodiment of a tree of single-level schedulers supporting a hierarchical packet scheduler in accordance with the teachings of the present invention.
Figure 8B:
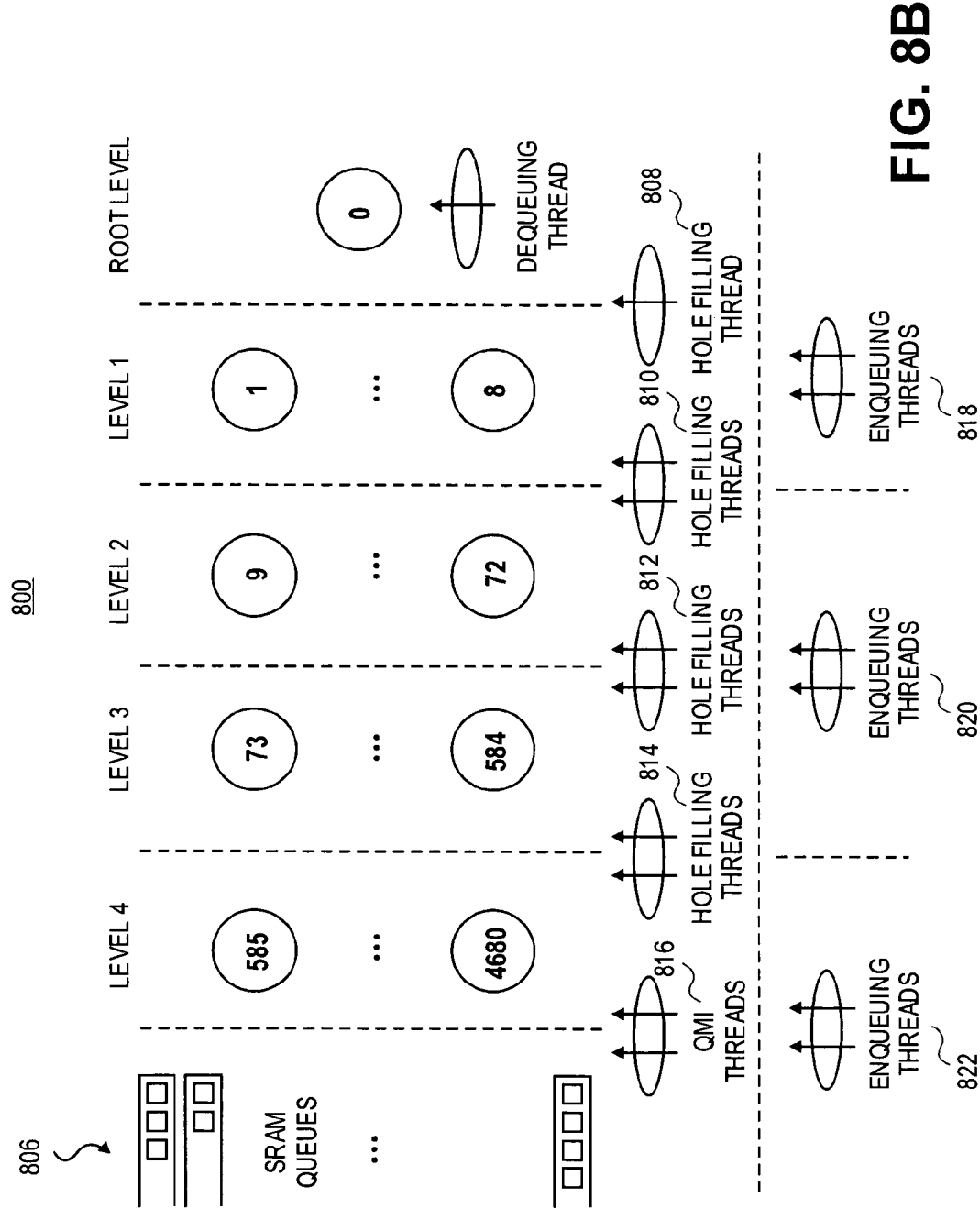
FIG. 8B is a block diagram illustrating one embodiment of a thread allocation scheme to support a hierarchical packet scheduler in accordance with the teachings of the present invention.

Referring to FIGS. 8A, 8B and 8C, an embodiment of the present invention implemented on an Intel® IXP 2800 network processor will now be discussed. It will be understood that embodiments of the invention are not limited to the following implementation.

Referring to FIG. 8A, a hierarchical packet scheduler 800 having five levels, level 0 to level 4, is shown. Level 0 is the root level, and level 4 is the leaf level. Virtual pipes 802 are a logical representation of physical pipe 804. In scheduler 800, a physical pipe 804 is represented by 32,000 virtual pipes 802. In one embodiment, each virtual pipe corresponds to an SRAM queue that feeds packet references to scheduler 800. Also in scheduler 800, 8 pipes (number 0 to 7) input into each scheduler on level 4. In one embodiment, the Shelf-Clocked Fair Queueing (SCFQ) algorithm is used for calculating the time stamp values associated with packet references.

Referring to FIG. 8B, threads associated with hierarchical packet scheduler 800 are shown. Scheduler 800 includes 4,681 schedulers having scheduler identifiers 0 to 4680. SRAM queues 806 are controlled by a Queue Manager and are used to hold packet references before being inserted into scheduler 800 using an enqueuing process. Each scheduler includes a buffer that may hold two packet references at a time. To determine the required number of threads and microengines needed to support scheduler 800, the types of threads and their respective processing load is examined.

The root level scheduler is maintained in Local Memory of a microengine. The schedulers of level 1 are also stored in Local Memory. In other NPUs, a different number of schedulers may be stored in local memory or another fast on-chip memory unit. In one embodiment, the state of schedulers is stored in the fastest memory unit available starting from the root scheduler and moving toward the leaf level until the fastest memory unit is full. In the IXP2800 network processor, one hole-filling thread 808 is sufficient to serve the root level. Because the schedulers have buffers with two entries, two packets may be inserted independently at the root level using two hole-filling threads. Thus, two hole-filling threads 810 are sufficient for serving hole-filling requests made by level 1 to level 2.

For the same reason, a single pair of threads is sufficient for communication between every two adjacent levels of scheduler 800, as shown by two hole-filling threads, 812, 814, and 816. Thus, the total number of dequeuing and hole-filling threads for scheduler 800 is 10. In other hierarchical scheduling configurations the number of threads may differ. The number of enqueuing threads will be discussed below.

Hole-filling threads serving levels 1-3 need to make scheduling decisions based on the state of the single-level schedulers (as discussed above in conjunction with FIG. 6). However, the hole-filling threads serving level 4 are obtaining packets from a Queue Manager without having to take into account the state of child schedulers of level 4 since level 4 has no child schedulers. These threads may be referred to as Queue Manager Interface (QMI) threads. Embodiments of interactions between a hierarchical packet scheduler and a QM will be discussed below in conjunction with FIGS. 9 and 10.

Another consideration is if the dequeuing and hole-filling threads are to run in the same or separate microengines. Results from building proof of concept prototype code indicate that the number of computer cycles required by each dequeuing or hole-filling thread is at best case between 50 and 100 cycles. Hence, the total number of compute cycles consumed by all threads per packet is great than 500 cycles. This total number exceeds the OC-48 network processor headroom of 228 cycles. Therefore, more than one microengine is needed for the execution of the dequeuing and hole-filling threads. Threads serving the same levels run in the same microengines. The distribution of threads among ME's will be discussed below.

Another consideration is the number of enqueuing threads that are used in scheduler 800. Scheduler 800 may interact with the QM in a push or pull manner. The number of enqueuing threads depends at least in part on the way the QM interacts with the hierarchical scheduler 800. First, the QM may notify scheduler 800 of transitions of queues from an empty to a backlogged state using Scratchpad memory or a Next Neighbor Register. Second, the QM may accept dequeue requests via Scratchpad memory.

In the enqueuing process, the next packet from the QM needs to be inserted into scheduler 800. For this reason, an enqueue thread needs to calculate the connection identification (referred to herein as connectionID) associated with the packet which has just been transmitted and issue a dequeue request about the next packet in the queue. The connectionID specifies the schedulers which a packet visits as it is being passed through the scheduling hierarchy from the leaf level toward the root level. An embodiment to calculate connectionID will be discussed below.

In another embodiment, when an empty queue of the QM becomes backlogged, the queue's head-of-line packet needs to be inserted into scheduler 800. Such information is communicated to the scheduler microblock.

The enqueuing threads at the leaf level need to interact with the QM in order to request that packet references be dequeued from the QM. Such information may be communicated via Scratchpad memory in a pull manner. However, communication via a slow interconnect such as Scratchpad memory is time consuming and costly. It requires at least one Scratchpad memory read access in order for a dequeue request to be issued and one Scratchpad memory write access in order for the request to be returned. In order to overcome this memory access overhead, the QM may be designed to communicate with the hierarchical packet scheduler via Local Memory. In this way, the hole-filling threads of the leaf level (QMIs) and the QM may run in the same microengine. In one embodiment, the QM runs in the same processing unit (ME or GPP) as the threads serving the leaf level of the hierarchical scheduler 800.

Another consideration is if the enqueuing threads are to execute in the same microengines as the dequeuing and hole-filling threads. Enqueuing and hole-filling threads may need to modify the same data sequentially.

If enqueuing threads run in separate MEs from the dequeuing and hole-filling threads, then enqueuing threads may be not able to access scheduler state information in a safe manner. Only threads running in the same microengine may access the same data structures in a safe manner without corrupting these data structures. Therefore, some enqueuing threads may run in the same ME with some hole-filling threads. In one embodiment, enqueuing threads and hole-filling threads serving the same levels need to run in the same microengines. In another embodiment, some enqueuing threads need to run in the same microengine as the hole-filling threads serving the root level.

In review, 10 threads are used to support dequeuing and hole-filling of hierarchical packet scheduler 800. One thread supports the dequeuing operation at the root level. One thread supports hole-filling at the root level as well. Two threads support hole-filling at each of the levels below the root level.

Referring to FIG. 8B, the enqueuing threads associated with hierarchical packet scheduler 800 will be discussed. Scheduler 800 uses 6 enqueuing threads in addition to the 10 dequeuing and hole-filling threads. Enqueuing threads 818 serve the root level and level 1. Enqueuing threads 820 serve levels 2 and 3. Enqueuing threads 822 serve level 4.

In scheduler 800, 3 MEs support the execution of the hierarchical packet scheduler data path. The estimated processing load of the dequeuing and hole-filling threads is at best base approximately 50-100 cycles (in scheduler 800, 31 compute cycles are required for calculating a minimum tag from 8 tag numbers). The estimate processing load for the enqueuing threads is approximately the same. Hence, three microengines are sufficient for supporting hierarchical packet scheduler 800.

Enqueuing threads of scheduler 800 do not run in separate MEs from the dequeuing threads and hole-filling threads. Instead, enqueuing threads are distributed in the same microengines where dequeuing and hole-filling threads run. The exact number of enqueuing threads depends on the processing load of the enqueuing threads. Enqueuing threads are distributed across the MEs where the dequeuing and hole-filling threads run. Table 1, shown in FIG. 8C, illustrates an embodiment of the distribution of threads among three MEs to support hierarchical packet scheduler 800.

Location of QM

Figure 9:
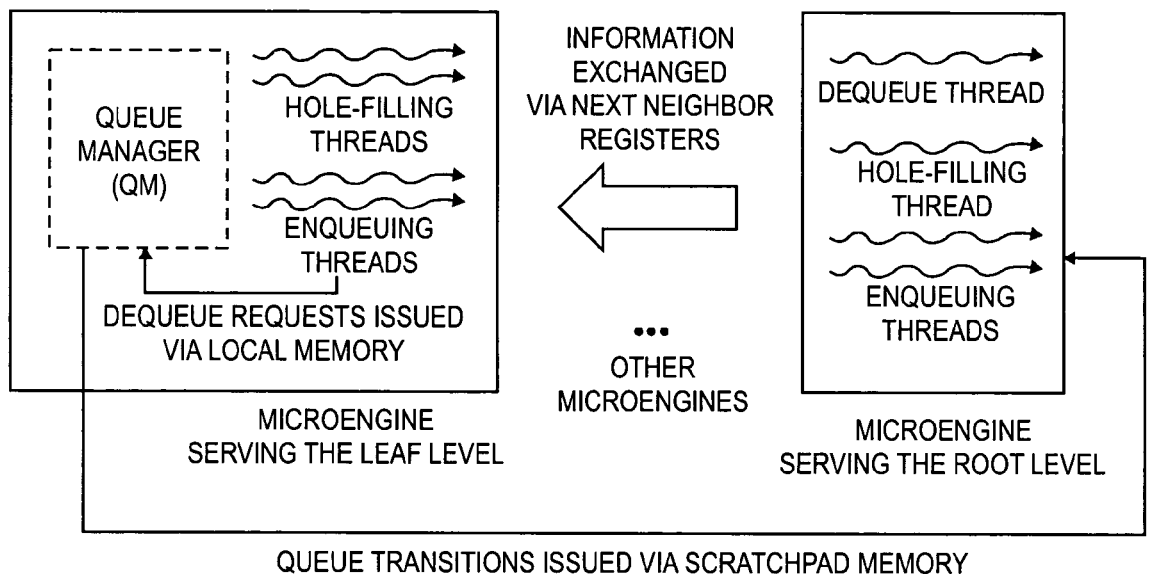
FIG. 9 is a block diagram illustrating one embodiment of integrating a queue manager with a hierarchical packet scheduler in accordance with the teachings of the present invention.

There are at least two embodiments regarding the interaction between a hierarchical packet scheduler and the Queue Manager. In one embodiment, as shown in FIG. 9, the QM is executed by the same processing unit (e.g., ME of GPP) which also executes the leaf level threads. In this embodiment, the QM announces queue transitions via some fast interconnect such as Scratchpad memory.

Figure 10:
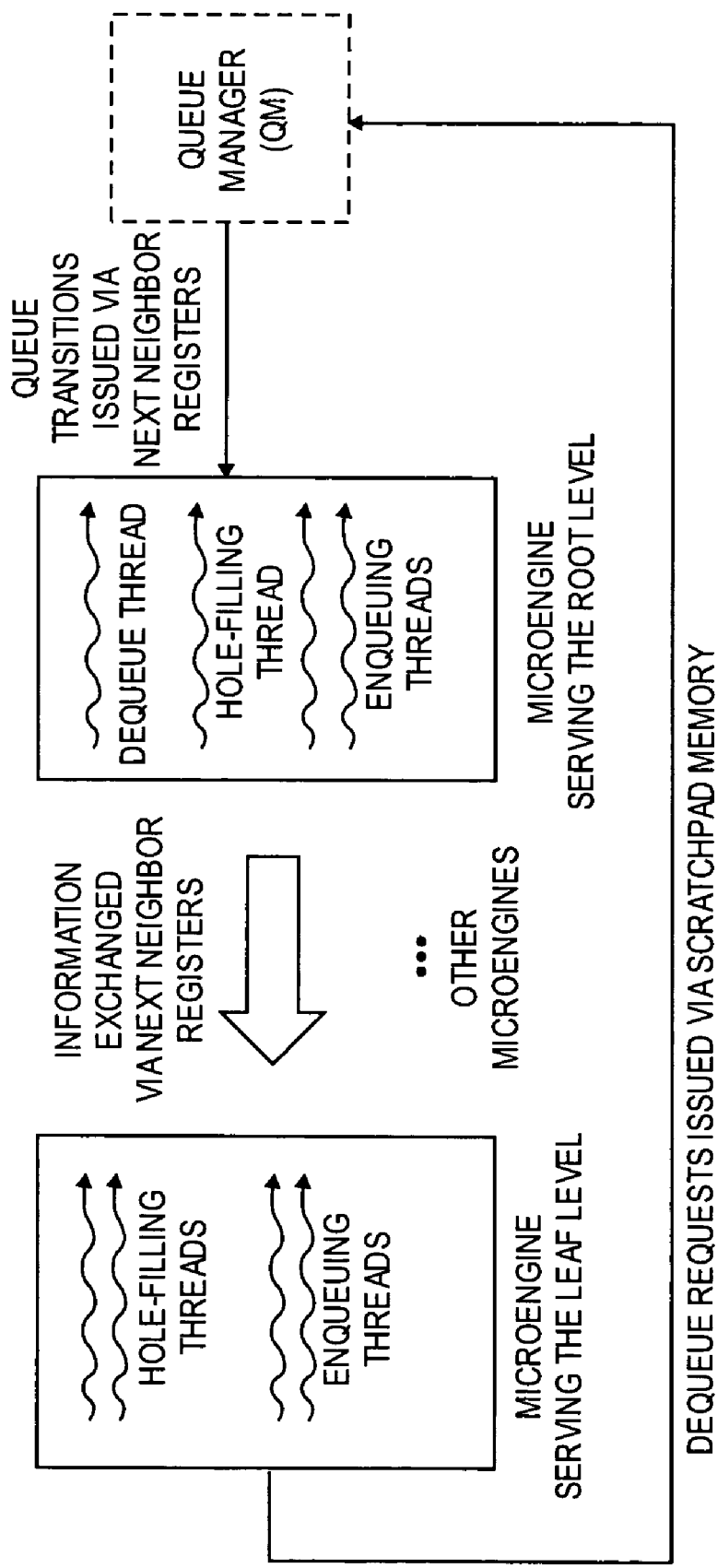
FIG. 10 is a block diagram illustrating one embodiment of integrating a queue manager with a hierarchical packet scheduler in accordance with the teachings of the present invention.

In another embodiment, as shown in FIG. 10, the QM is located in a separate microengine or GPP. In this particular embodiment, the processing unit executing the QM is different from the processing unit executing the threads serving the root level. In this case the QM announces queue transitions via some interconnect not necessarily the same as the interconnect used in the embodiment of FIG. 9 (e.g., Next Neighbor Registers). The leaf level threads may issue dequeue requests via Scratchpad memory.

Table 2, as shown in FIG. 11, summarizes computer cycle costs of the embodiments of FIGS. 9 and 10 for the IXP2800 network processor. It will be noted from Table 2 that collocating the QM with the leaf level threads uses one less Scratchpad memory put operation than locating the QM in a separate ME.

In hierarchical packet scheduler 800 of FIGS. 8A-8C, the QM is collocated with the hole-filling threads serving the leaf level. In one embodiment, specific to the IXP2800 network processor, communications may take place between MEs of scheduler 800 as follows. The enqueuing threads at the root level obtain information about queue transitions from the Queue Manager via Scratchpad memory. The enqueuing threads at the root level may send enqueuing requests to the next pair of enqueuing threads through Next Neighbor Registers. The second pair of enqueuing threads communicates in the same manner with the third pair of enqueuing threads serving the leaf level. Hole-filling threads also exchange messages via Next Neighbor Registers or Local Memory. The dequeuing thread at the root level issues hole-filling requests at line rate. The hole-filling thread serving the root level also issues hole-filling requests to the thread serving level 1. The thread serving level 1 issues requests to the threads serving level 2, etc. Finally, the hole-filling threads serving the leaf level issue dequeue requests to the QM via Local Memory.

Memory Usage and Data Structures

Figure 12:
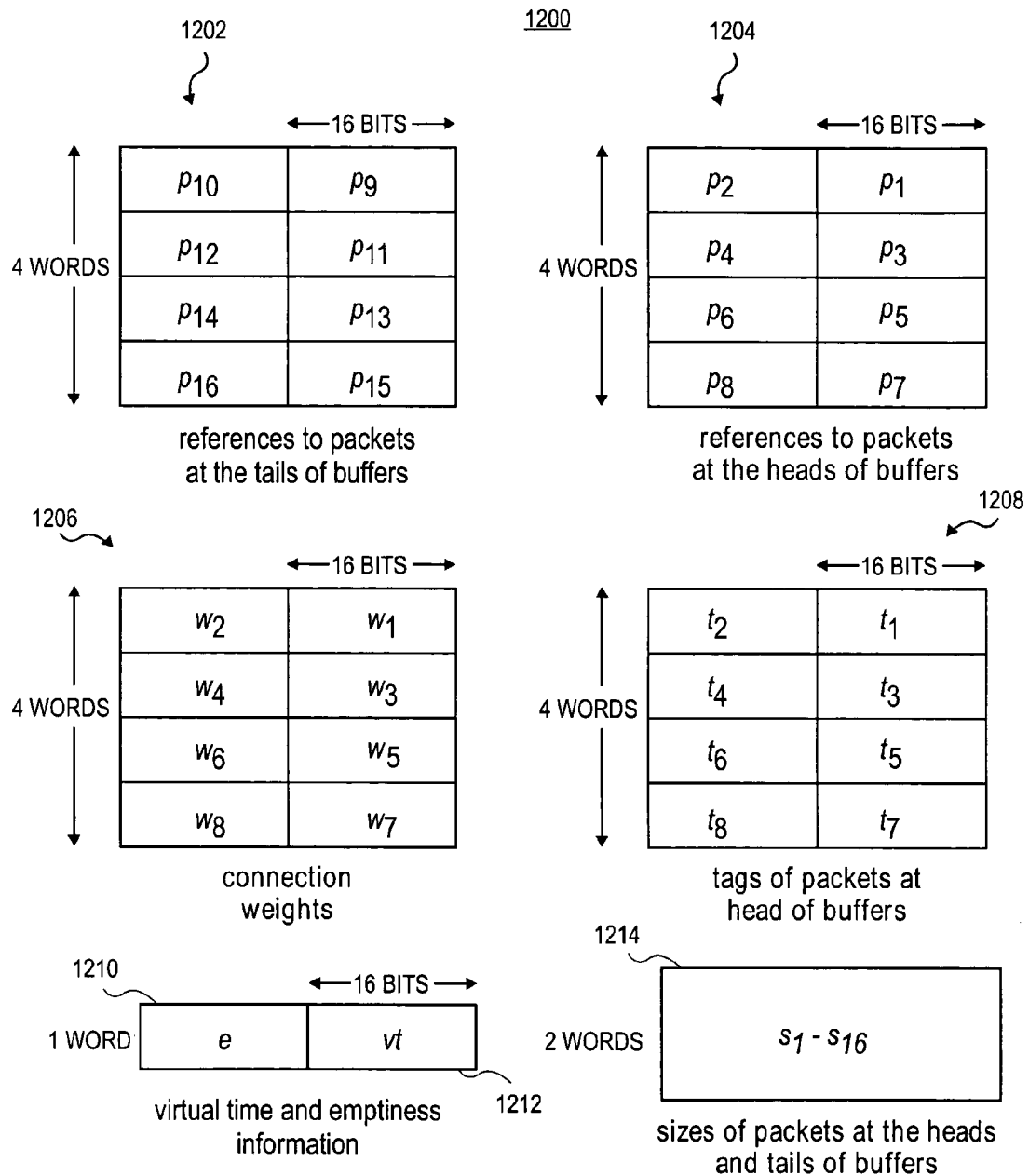
FIG. 12 is a block diagram illustrating a single-level scheduler state used for supporting a hierarchical packet scheduler in accordance with the teachings of the present invention.
Figure 13:
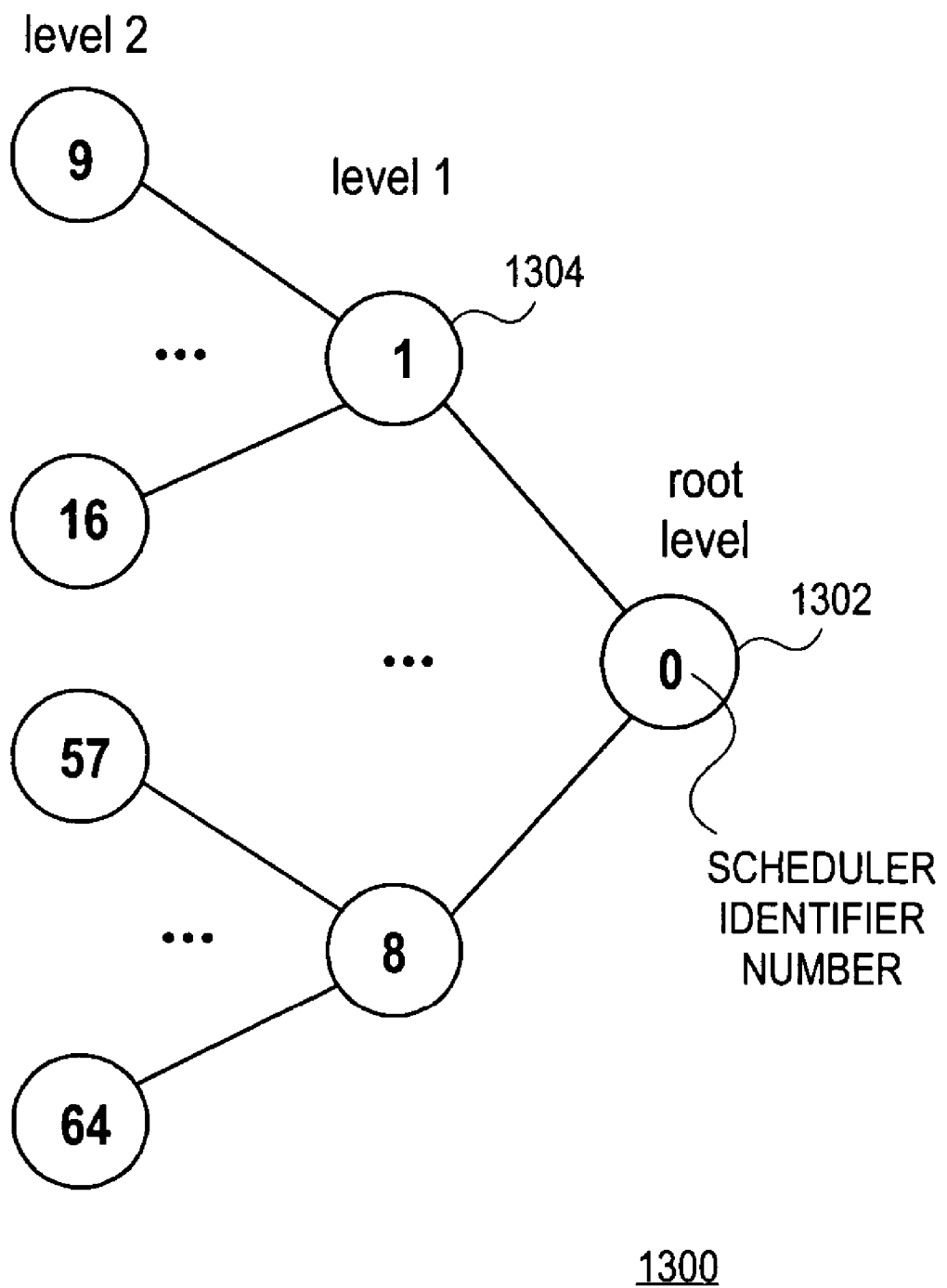
FIG. 13 is a block diagram illustrating one embodiment of a naming scheme of a hierarchical packet scheduler in accordance with the teachings of the present invention.

Turning to FIGS. 12-14, embodiments of memory use and data structures of a hierarchical packet scheduler will be discussed. Each scheduler maintains packet reference information and their respective tags. Each scheduler also is associated with identifiers so that each parent scheduler can reference its child schedulers when writing messages to message boards.

Turning to FIG. 12, an embodiment of a data structure 1200 associated with each scheduler is shown. In one embodiment, the scheduler data structures are maintained in external SRAM. In other embodiments, other types of memory may be used. The discussion of data structure 1200 includes field lengths for implementation on an IXP 2800 where a word is 32-bits long. However, it will be understood that alternative embodiments of data structure 1200 may be implemented to complement other processors.

Packet references, such as pointers, at the tail of buffers, p10-p15, are shown at 1202 and the corresponding packet references at the head of buffers, p1-p8, are shown at 1204. Thus, each scheduler maintains information in 8 buffers, with two packets per buffer, for a total of 16 packets. Each packet reference is 16-bits long. Further, packet sizes, s1-s16, as shown at 1214, are quantified as multiples of 128 bytes.

Tags of packets at the heads, t1-t8, as shown at 1208, are represented using 16 bits. In this embodiment, the tags of the packets in the tails are not stored. The tags of the tails may be computed when the packet is forwarded from the tail to the head of its buffer. In another embodiment, for each two-packet buffer in each scheduler, both the tags of the packet references at the head and tail of the buffer may be stored.

Connection weights, w1-w7, as shown at 1206, are represented by 16 bits. In one embodiment, connections weights describe the distribution of bandwidth of the connections between schedulers.

The schedulers current virtual time, vt, as shown at 1212, is 16-bits long, and the schedulers emptiness information, e, is shown at 1210. In one embodiment the current virtual time is defined as the tag of the packet which is currently being transmitted. In another embodiment, virtual time is the tag of the last packet which has been previously transmitted if no packet is currently sent to the network. "Emptiness information" refers to a collection of bits, where each bit is associated with one distinct scheduler entry. If one particular bit of e is equal to one, then this means that a packet reference is stored in this bit's associated entry. Otherwise the entry is empty.

Thus, the state of a single scheduler as defined by data structure 1200 includes 19 words. 4 words for packet references, 4 words for packet tags, 4 words for connection weights, 2 words for packet sizes, and 1 word for virtual time and emptiness information.

Table 3 of FIG. 14 shows memory usage of various sizes of hierarchical packet schedulers. In the embodiments illustrated in Table 3, the number of input connections to each single-level scheduler is 8.

Scheduler Identifiers

In one embodiment, the identity of a child scheduler may be calculated from the identity of a parent scheduler. Turning to FIG. 13, a portion of a hierarchical packet scheduler 1300 is shown. Each scheduler is assigned an identifier number from 0 to N, where N+1 is the number of schedulers. For example, a root level scheduler 1302 has a scheduler identifier of 0.

The relationship between a child scheduler identifier Ic and a parent scheduler identifier Ip may be defined by Equation 1:

$$Ic = m \cdot Ip + ep + 1 \quad \text{[Equation 1]}$$

where m is the number of child schedulers connected to the parent scheduler, and ep is the index of the entry associated with the child scheduler of the parent, where the entries are numbered from 0 to (E−1), where E is the number of entries. From Equation 1, it is evident that a multiplication operation and an addition operation are sufficient to derive a child scheduler identifier from a parent scheduler identifier.

For example, in FIG. 13, the child scheduler identifier of the first entry of scheduler 1, shown at 1304, in level 1 may be calculated as follows: $Ic = 8 \cdot 1 + 0 + 1 = 9$. In this example, m is equal to 8 (schedulers 9 to 16) and ep is equal to 0 since the first index entry was desired. In another example, the $8^{th}$ child scheduler identifier of scheduler 1 may be calculated as follows: $Ic = 8 \cdot +7 + 1 = 16$, where m=8, Ip=1, and ep=7.

Connection Identifiers

In one embodiment, a connection between schedulers is associated with a connectionID for use by enqueuing threads. The connectionID may be used for deriving all schedulers in the path which the packet references follow from the leaf level to the root level. In one embodiment the connectionID is calculated by concatenating the indexes of all scheduler entries in a connection's associated forward or reverse path.

The identifier of a scheduler at a particular level in the path may be calculated from the indexes of scheduler entries included in the connectionID and by using Equation 2:

$$ep = \text{connectionID}[\log_2 m(p-1) : \log_2 m \cdot p - 1] \quad \text{[Equation 2]}$$

where ep is the entry index calculated for a particular parent scheduler at level p, and where m is the number of child schedulers connected to the parent scheduler at level p. Since ep is a subset of the bits of connectionID, in one embodiment, to calculate ep, a shift and an AND operation on the connectionID field associated with a packet reference's connection is sufficient.

Reverse Path Enqueuing

In one embodiment, to enqueue a packet into the hierarchical packet scheduler, the logic may begin at the leaf level and follow the forward path of the packet looking for a scheduler to insert the packet into. This embodiment may be time expensive because of the latency associated with propagating a packet through empty schedulers at the lower levels of the hierarchy.

In another embodiment, the enqueuing may be performed from the root level towards the leaf level. This enqueuing technique is referred to herein as "reverse-path enqueuing." In general, reverse-path enqueuing entails placing a new packet into the last empty scheduler entry in a packet's forward path by examining scheduler entries one by one following the packet's reverse path. The packet is enqueued in the first non-empty scheduler or into the last empty scheduler in its forward path by examining the packet's reverse path from root level to the leaf level.

Referring to FIG. 15, an embodiment of reverse path enqueuing is illustrated. Case 1 is shown at 1502. In case 1, the packet reference is inserted into the first non-empty scheduler in the forward path of the packet reference. Entry 1506 of scheduler 1504 in the packet reference's path has an empty space that an enqueued packet may be inserted into.

In case 2, shown at 1510, the packet reference is inserted into the last empty scheduler in the forward path. Scheduler 1514 is full, but scheduler 1512 has available entries in the packet reference's forward path. In one embodiment, the packet reference is placed in the head of the empty buffer in scheduler 1512.

Reverse path enqueuing uses the connectionID of a packet reference to find a scheduler for enqueuing the packet into.

The connectionID can be used to derive the single-level schedulers which a packet reference visits as it is being passed through the scheduling hierarchy toward the root level. The connectionID of a packet reference may be calculated at the time of enqueuing (calculation of connectionID discussed above in connection with Equation 2). Thus, it is possible to find the first non-empty scheduler of the packet reference's path from the leaf to the root level by knowing the packet reference's associated connectionID and by reading the emptiness bits of each scheduler's state.

Each enqueuing thread accesses the state of all scheduler in the reverse path which are served by the hole-filling threads in the same ME. In this way each enqueuing thread can identify whether a new packet reference should be inserted into one of the schedulers served by the current ME. If the packet cannot be inserted in any of the schedulers in the current ME, an enqueuing thread issues an enqueuing request to the next ME in the reverse path. The process is repeated until the packet is enqueued into a single level scheduler.

Block-State Table and Transit Buffering

To enqueue a packet from the QM to the hierarchical packet scheduler, the QM needs to know when to remove a packet reference from a physical queue and when not to. When a packet reference is ready to be inserted in the hierarchical packet scheduler, there may be a case that all the schedulers in the packet reference's path are full. In this case, it would be incorrect for the QM to remove the packet reference from its external SRAM queue. To resolve this issue, a block state table to denote if SRAM queues are blocked from dequeuing packet references may be used.

The block state table can be accessed by the QM at queue transition time. The block state table indicates if each SRAM queue is blocked or not. If a queue is not blocked, then the QM proceeds to push the packet from its physical queue into the hierarchical packet scheduler and announces the transition. If the queue is blocked, then the QM keeps the packet in its SRAM queue and announces the transition without removing the packet from the SRAM queue. The block state table is updated by enqueuing threads.

A problem may occur when packet references are in transit to the hierarchical packet scheduler and the schedulers in the packet reference's path become full during this transit time. These packets in transit still need to be enqueued into the hierarchical packet scheduler before other packets arriving and after the SRAM queue becomes blocked. In one embodiment, shown in FIG. 16, a transit buffer 1608 is used to hold these packets in transit.

Figure 16:
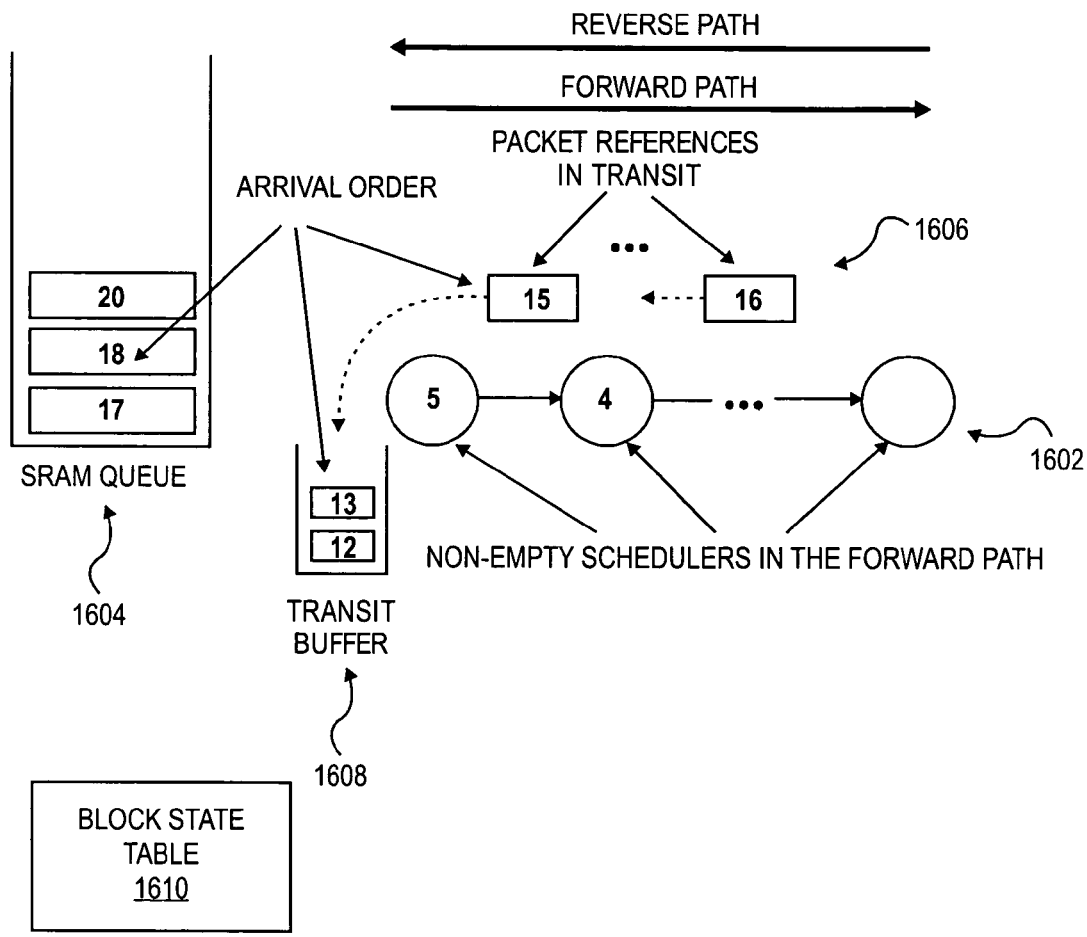
FIG. 16 is a block diagram illustrating one embodiment of a transit buffering mechanism to support a hierarchical packet scheduler in accordance with the teachings of the present invention.

Referring to FIG. 16, packet references from SRAM queue 1604 are enqueued into scheduler 1602. The numbers in the packet references refer to the arrival order of the packet references at the SRAM queue 1604, where packet references with a lower number have arrived before packet references with a higher number.

In the embodiment of FIG. 16, when packet references 15 and 16 were enqueued from SRAM queue 1604, their reverse path in scheduler 1602 was not full. However, when packet references 15 and 16 arrive at scheduler 1602 and transition through the packet reference's reverse path from the root level to the leaf level, the path has become full. The path was filled by other packet references that were in transit when the path was not full.

To avoid packet references 15 and 16 from being discarded or being placed out of order in scheduler 1602, packet references 15 and 16 are placed into a transit buffer 1608. Further, as long as at least one packet reference is in the transit buffer 1608, SRAM queue 1604 is blocked by block state table 1610. This allows the packet references in the transit buffer 1608 to be enqueued into scheduler 1602 so that these packets do not lose their place in the packet arrival order. In one embodiment, since the number of packet references placed in the transit buffer 1608 is expected to be small (approximately 2-3 packets), a small push-back buffer may be used in the place of the transit buffer 1608.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description.

The terms used in the following claims should not be construed to limit the invention to the specific embodiments disclosed in the specification. Rather, the following claims are to be construed in accordance with established doctrines of claim interpretation.

What is claimed is:

1. An article of manufacture comprising:
a machine-accessible storage medium on which is stored a plurality of executable instructions which, when executed on a processor, perform operations comprising:
  enqueing packet references into a hierarchical packet scheduler, wherein the hierarchical packet scheduler includes one or more levels, each level including one or more schedulers being served by one or more threads, wherein the number of threads serving a particular level is not dependent on the number of schedulers on the particular level;
  dequeuing packet references from the hierarchical packet scheduler at a root level scheduler of the one or more schedulers; and
  performing hole-filing operations to fill holes created in the one or more schedulers when packet references are passed toward the root level scheduler, the hole-filing operations including:
    obtaining a hole-filling message from a message board associated with a parent scheduler of the hierarchical packet scheduler, the parent scheduler having a hole to receive a packet reference;
    obtaining a state of a child scheduler that is identified in the hole-filling message, wherein the child scheduler includes the packet reference that is to fill the hole of the parent scheduler;
    identifying a tag packet reference in the child scheduler; and
    inserting the tag packet reference into the parent scheduler;
  wherein a first hole-filling operation is performed at a first scheduler without waiting for other hole-filling operations at levels further from the root level to complete.

2. The article of manufacture of claim 1 wherein packet references are passed between the one or more levels at a line rate of a physical connection associated with the hierarchical packet scheduler, and wherein packet references are dequeued from the root level scheduler at the line rate.

3. The article of manufacture of claim 1 wherein the hole-filling operations are conducted by one or more hole-filling threads operating in parallel, wherein the one or more hole-filling threads are each assigned to serve a particular level of the hierarchical packet scheduler.

4. The article of manufacture of claim 1 wherein the tag packet reference comprises a minimum tag packet reference, wherein the inserting the minimum tag packet reference creates a hole in the child scheduler, and wherein performing hole-filling operations further includes:
- calculating a scheduler identifier of a scheduler that stores a packet reference to be used to fill the hole of the child scheduler; and
- writing a message into a message board associated with the child scheduler that the child scheduler has the hole.

5. The article of manufacture of claim 4 wherein the scheduler identifier is calculated in accordance with the following:
the scheduler identifier=m·Ic+ec+1,
- where m is the number of child schedulers of the child scheduler, Ic is the child scheduler identifier, and ec is an index of the entry of the child scheduler associated with the scheduler to be identified.

6. The article of manufacture of claim 1 wherein each scheduler includes at least one packet reference buffer, each packet reference buffer to have a plurality of entries, each entry to be able to store a packet reference.

7. The article of manufacture of claim 6 wherein a number of entries in each packet reference buffer is equal to a number of hole-filling threads serving a level of the hierarchical packet scheduler.

8. The article of manufacture of claim 6 wherein a number of entries in each packet reference buffer is equal to the smallest integer greater than a ratio between a hole-filling operation completion time and a network processor headroom time of a network processor to execute the hole-filling operation.

9. The article of manufacture of claim 1 wherein dequeuing packet references comprises:
- calculating a current minimum tag packet reference in the root level scheduler to be transmitted based on tag packet references in the root level scheduler;
- calculating a child scheduler identifier of a child scheduler of the root level scheduler, the child scheduler having a packet reference to be used to fill a hole of the root level scheduler;
- writing a message into a message board associated with the root level scheduler indicating the root level scheduler has the hole; and
- outputting the current minimum tag packet reference from the root level scheduler.

10. The article of manufacture of claim 1 wherein enqueuing packet references comprises:
- obtaining a new packet reference to be inserted into the hierarchical packet scheduler;
- finding a scheduler in the hierarchical packet scheduler to insert the new packet reference into, wherein the scheduler contains the last empty scheduler entry in the new packet reference's forward path from a leaf level to a root level of the hierarchical packet scheduler;
- calculating a tag for the new packet reference for the scheduler; and
- inserting the new packet reference into the scheduler.

11. The article of manufacture of claim 10 wherein finding the scheduler includes performing reverse-path enqueuing, wherein reverse-path enqueuing includes examining the schedulers from the root level to the leaf level in the new packet reference's forward path.

12. The article of manufacture of claim 11 wherein performing reverse-path enqueuing includes calculating a connection identifier along the new packet reference's forward path, wherein the connection identifier identifies the schedulers in the new packet's forward path in the hierarchical packet scheduler, wherein the connection identifier is derived by concatenating the indexes of entries in the new packet reference's forward path.

13. The article of manufacture of claim 11 wherein execution of the plurality of executable instructions on the processor further perform operations comprising:
- buffering the new packet reference in a transit buffer if all the schedulers in the new packet reference's forward path are full after the new packet reference is dequeued from a packet reference queue.

14. A system comprising:
- at least one network processor; and
- a storage device communicatively coupled to the at least one network processor, the storage device having stored a plurality of instructions which when executed by the at least one network processor perform operations comprising:
  - enqueing packet references into a hierarchical packet scheduler, wherein the hierarchical packet scheduler includes one or more levels, each level including one or more schedulers being served by one or more threads, wherein the number of threads sewing a particular level is not dependent on the number of schedulers on the particular level; and
  - dequeuing packet references from the hierarchical packet scheduler at a root level scheduler of the one or more schedulers, wherein dequeuing packet references comprises:
    - calculating a current minimum tag packet reference in the root level scheduler to be transmitted based on tag packet references in the root level scheduler; and
    - outputting the current minimum tag packet reference from the root level scheduler;
- wherein each scheduler includes at least one packet reference buffer, each packet reference buffer to have a plurality of entries, each entry to be able to store a packet reference, and wherein a number of entries in each packet reference buffer is equal to the smallest integer greater than a ratio between a hole-filling operation completion time and a network processor headroom time of a network processor to execute the hole-filling operation.

15. The system of claim 14 wherein packet references are passed between the one or more levels at a line rate of a physical connection associated with the hierarchical packet scheduler, and wherein packet references are dequeued from the root level scheduler at the line rate.

16. The system of claim 14 wherein execution of the plurality of instructions further perform operations comprising:
- performing hole-filling operations to fill holes created in the one or more schedulers when packet references are passed toward the root level scheduler, wherein a first hole-filling operation is performed at a first scheduler without waiting for other hole-filling operations at levels further from the root level to complete.

17. The system of claim 16 wherein the hole-filling operations are conducted by one or more hole-filling threads operating in parallel, wherein the one or more hole-filling threads are each assigned to serve a particular level of the hierarchical packet scheduler.

18. The system of claim 14 wherein a number of entries in each packet reference buffer is equal to a number of hole-filling threads serving a level of the hierarchical packet scheduler.

19. The system of claim 14 wherein enqueing packet reference comprises:
- obtaining a new packet reference to be inserted into the hierarchical packet scheduler;
- finding a scheduler in the hierarchical packet scheduler to insert the new packet reference into, wherein the scheduler contains the last empty scheduler entry in the new packet reference's forward path from a leaf level to a root level of the hierarchical packet scheduler; and
- inserting the new packet reference into the scheduler.

* * * * *

UNITED STATES PATENT AND TRADEMARK OFFICE
CERTIFICATE OF CORRECTION

PATENT NO. : 7,646,779 B2  Page 1 of 1
APPLICATION NO. : 11/020942
DATED : January 12, 2010
INVENTOR(S) : Kumar et al.

It is certified that error appears in the above-identified patent and that said Letters Patent is hereby corrected as shown below:

In column 18, at line 23, delete "sewing" and insert --serving--.

Signed and Sealed this

Sixth Day of April, 2010

David J. Kappos
*Director of the United States Patent and Trademark Office*